US007785897B2

(12) United States Patent
Agnes et al.

(10) Patent No.: US 7,785,897 B2
(45) Date of Patent: Aug. 31, 2010

(54) METHOD AND APPARATUS FOR PRODUCING A DISCRETE DROPLET FOR SUBSEQUENT ANALYSIS OR MANIPULATION

(75) Inventors: George Agnes, Coquitlam (CA); Xiao Feng, Halifax (CA); Michael Bogan, Vancouver (CA)

(73) Assignee: Simon Fraser University, Burnaby, B.C. (CA)

( * ) Notice: Subject to any disclaimer, the term of this patent is extended or adjusted under 35 U.S.C. 154(b) by 1673 days.

(21) Appl. No.: 10/399,823

(22) PCT Filed: Oct. 23, 2001

(86) PCT No.: PCT/CA01/01496

§ 371 (c)(1), (2), (4) Date: Oct. 23, 2003

(87) PCT Pub. No.: WO02/35553

PCT Pub. Date: May 2, 2002

(65) Prior Publication Data

US 2004/0063113 A1 Apr. 1, 2004

Related U.S. Application Data

(60) Provisional application No. 60/242,058, filed on Oct. 23, 2000.

(51) Int. Cl.
*G01N 24/00* (2006.01)

(52) U.S. Cl. ....................................... 436/173; 250/283

(58) Field of Classification Search ....................... None
See application file for complete search history.

(56) References Cited

U.S. PATENT DOCUMENTS 5,532,140 A 7/1996 Arnold et al.

(Continued)

FOREIGN PATENT DOCUMENTS

GB 2346730 A 8/2000

(Continued)

OTHER PUBLICATIONS

Vehring et al. "Electrodynamic trapping and manipulation of particle clouds", Rev. Sci. Instrum., 1997, v. 68, No. 1, pp. 70-78.*

(Continued)

*Primary Examiner*—Yelena G Gakh
(74) *Attorney, Agent, or Firm*—Chernoff, Vilhauer, McClung & Stenzel, LLP

(57) ABSTRACT

A method and apparatus for producing a discrete particle for subsequent analysis (such as mass spectrometry) or manipulation is disclosed. A discrete particle is generated by a particle generator. A net charge is induced onto the particle by an induction electrode. The particle is delivered to a levitation device where it is then electrodynamically levitated. If the particle is a droplet, desolvation will occur, leading to Coloumbic fissioning of the droplet into smaller droplets. The movement of the levitated droplet(s) can be manipulated by an electrode assembly. The droplet(s), and the charge thereon, can be delivered to a mass spectrometer in one aspect of the invention, providing an ion source for mass spectrometry without the detrimental space charge effects of electrospray ionization techniques. In another aspect of the invention, the levitated particle(s) may be controllably and precisely deposited onto a plate for subsequent analysis by matrix assisted laser desorption and ionization mass spectrometry.

56 Claims, 16 Drawing Sheets

U.S. PATENT DOCUMENTS

| | | | | |
|---|---|---|---|---|
| 5,770,860 | A * | 6/1998 | Franzen | 250/288 |
| 6,541,769 | B1 * | 4/2003 | Takada et al. | 250/290 |

FOREIGN PATENT DOCUMENTS

| | | |
|---|---|---|
| JP | 63-318061 | 12/1988 |
| JP | 09-213498 | 8/1997 |
| JP | 10-048110 | 2/1998 |
| JP | 2000-067806 | 3/2000 |
| JP | 2000-113852 | 4/2000 |
| JP | 2000-123780 | 4/2000 |
| WO | 9324209 | 12/1993 |
| WO | 00/52455 | 2/2000 |
| WO | 0048228 A1 | 8/2000 |

OTHER PUBLICATIONS

Tang et al. "Theoretical prediction of charged droplet evaporation and fission in electrospray ionization", Int. J. Mass Spectrom., 1999, v. 185/186/187, pp. 97-105.*

Hu et al. "Design of Traveling-Wave Field Panel for Pharmaceutical Powders Based on Computer Simulation of Particle Trajectories", IEEE Transactions on Industry Applications, vol. 33, No. 3, May/Jun. 1997, pp. 641-650.*

Yang et al. "Laser Desorption Mass Spectrometry of a Levitated Single Microparticle in a Quadrupole ion Trap", Anal. Chem. 1995, v. 67, pp. 1021-1025.*

Vehring R. et al., Electrodynamic trapping and manipulation of particle clouds, Review of Scientific Instruments, Jan. 1997, AIP, USA, vol. 68, No. 1, pt. 1, p. 70-78.

Li Y. et. al., Ultrahigh-resolution Fourier transform mass spectrometry of biomolecules above m/z 5000, International Journal of Mass Spectrometry and Ion Processes, Dec. 20, 1996, Elsevier, Netherlands, vol. 157-158, p. 175-188.

Satoshi K. et al., Movement of Micrometer-sized particles in the evanescent field of a laser beam, Optics Letters, Optical Society of America, Washington, US, vol. 17, No. 11, Jun. 1, 1992, p. 772-774.

Swanson B. et al., Electrodynamic trapping and manipulation of ice crystals, Quarterly Journal of the Royal Meteorological Society, Apr. 1999, R. Meteorol. Soc, UK, vol. 125, No. 555, p. 1039-1058.

Hu D. et al., Design of traveling-wave field panel for pharmaceutical powders based on computer simulation of particle trajectories, Ieee Transactions on Industry Applications, May-Jun. 1997, IEEE, USA, vol. 33, No. 3, p. 641-650.

Bahr U et al., A charge detector for time-of-flight mass analysis of high mass ions produced by matrix-assisted laser desorption/ionization (MALDI), International Journal of Mass Spectrometry and Ion Processes, 153,1996, vol. 153, No. 1, p. 9-21.

Gauthier RC et al., Optical levitation particle delivery system for a dual beam fiber optic trap, Applied Optics, vol. 39, No. 1, Jan. 1, 2000, p. 26-33.

Arnold, S. et al. Fluorescence spectrometer for a single electrodynamically levitated microparticle, Ref. Sci. Instrum. 57 (9), Sep. 1986.

Barnes, M.D. et al., Detection of Single Rhodamine 6G Molecules in Levitated Microdroplets, Anal. Chem. 1993, 65. p. 2360-2365.

Dale, J.M. et al., Chemical Characterization of Single Particles by Laser Ablation/Desorption in a Quadrupole Ion Trap Mass Spectrometer, Anal. Chem. 1994, 66, p. 3431-3435.

Davis, E.J., A History of Single Aerosol Particle Levitation, Aerosol Science and Technology, 26:3, p. 212-254, 1997.

Davis, E.J., The double-ring electrodynamic balance for microparticle characterization, Rev. Sci. Instrum., 61(4), Apr. 1990, p. 1281-1288.

Feng X. et al., Mico-heterogeneous catalysis at the surface of electrodynamically levitated particles, Aerosol Science 32 (2001), 1147-1159.

Feng X. et al., Single Isolated Droplets With Net Charge as a Source of Ions, J. Am. Soc. Mass Spectrom., 2000, 11, p. 393-399.

Hager, D.B. et al., Behavior of Microscopic Liquid Droplets near A Strong Electrostatic Field: Droplet Electrospray, Anal. Chem. 1994, 66, p. 1593-1594.

Lazar, AC. et al., Real-Time Surface Analysis of Individual Airborne Environmental Particles, Environ. Sci. Technol., 1999, 33, p. 3993-4001.

Li, W. et al., Formation and Properties of Aerocollodial Tio2-Coated Microspheres Produced by Alkoxide Droplet Reaction, Journal of Colloid and Interface Science, 162, p. 267-278, 1994.

Ng, K.C. et al., Polymer microparticle arrays for electrodynamically focused microdroplet streams, Review of Scientific Instruments, vol. 71, No. 6, Jun. 2000.

Olesik, J.W. et al., Investigating the Fate of Individual Sample Droplets in Inductively Coupled Plasmas, Focal Point, vol. 51, No. 5, 1997 p. 158A-075A.

Riley, P.T.A. et al., Real-Time Characterization of the Organic Composition and Size of Individual Diesel Engine Smoke Particles, Environmental Science & Technology, vol. 32, No. 18, 1998, p. 2672-2679.

Shaffer, S.A. et al., A Novel Ion Funnel for Focusing Ions at Elevated Pressure Using Electrospray Ionization Mass Spectrometry, Rapid Communication in Mass Spectrometry, vol. 11, 1997, p. 1813-1817.

Spjut, R..E. et al., Laser Heating and Particle Temperature Measurement in an Electrodynamic Balance, Longmuir, 1985, 1, p. 355-360.

Taflin, D.C. et al., Electrified Droplet Fission and the Rayleight Limit, Langmuir, 1989, 5, p. 376-384.

Xiong, Y. et al., Droplet Evaporation and solute precipitation during spray pyrolysis, Journal of Aerosol Science, vol. 24, issue 7, Oct. 1993, p. 893-908.

Yang M., et al., Laser Desorption Mass Spectrometry of a Levitated Single Microparticle in a Quadrupole Ion Trap, Anal. Chem. 1995, 67, 1021-1025.

Feng, X; Chuah, L.; Agnes, G.R., Investigations of single isolated droplets: a source of ions for mass spectrometry and as an interesting chemical reaction vessel FACSS, Vancouver, B.C., Oct. 1999.

* cited by examiner

METHOD AND APPARATUS FOR PRODUCING A DISCRETE DROPLET FOR SUBSEQUENT ANALYSIS OR MANIPULATION

REFERENCE TO RELATED APPLICATION

This application claims the benefit of U.S. provisional application Ser. No. 60/242,058 filed Oct. 23, 2000.

TECHNICAL FIELD

This invention pertains to the production of a discrete particle for application, for example, in the field of mass spectrometry.

BACKGROUND

Mass spectrometry is a technique that weighs individual molecules, thus providing valuable chemical information. A mass spectrometer operates by exerting forces on charged particles (ions) in a vacuum using magnetic and electric fields. A compound must be charged (ionized) to be analyzed in a mass spectrometer. The ions must be introduced in the gas phase into the vacuum of the mass spectrometer. Ionizing large molecules of biological origins such as proteins, peptides and strands of DNA and RNA has proven difficult in the past since these molecules have effectively zero vapour pressure and are labile. A major thrust in mass spectrometry for some time has been the development of ionization sources for such large bio-molecules.

With the mapping of the genome, much research is now focused on understanding how cells function, individually and as a component in a tissue or a larger organism. It is hoped that this information will be useful for the control and eradication of certain diseases and the repair of damaged body parts. It is believed that the characterization and measurement of proteins expressed in cells will enhance the understanding of cellular function. A challenge in protein measurement, however, is sensitivity since there are estimated to be approximately 100,000 distinctly different proteins in any one cell. There could be as few as one or two proteins in any one cell or as many as several hundred or more. Currently, the only way to study the expression levels of proteins is to isolate a population of cells, typically more than 1 million cells, and perform analysis on the proteins isolated from that population of cells. Even in these situations, however, the proteins that are expressed at low levels are generally not identified because their numbers are below the level of detection.

Electrospray ionization ("ESI") and matrix-assisted laser desorption and ionization ("MALDI") are two techniques that have been developed to ionize large bio-molecules.

ESI is a desolvation method in which a high DC electric potential is applied to a metallic capillary needle that is separated from a counter electrode held at a lower DC potential. The electric field causes a liquid (containing the analyte in solution) emerging from the capillary to be dispersed into a fine spray of millions of charged droplets. The droplets in the aerosol carry a net charge of the same polarity as the electric field. As the solvent evaporates from the droplets, the droplets decrease in size, increasing the charge concentration on the droplet surface. Eventually, a "Coulombic explosion" occurs when Coulombic repulsion overcomes a droplet's surface tension. This results in the droplet exploding, forming a series of smaller, lower charged droplets. This process of shrinking and exploding repeats until individually charged analyte ions are formed. The rate of solvent evaporation can be increased by introducing a drying gas flow counter to the current of the sprayed ions. Nitrogen is frequently used as the drying gas.

With evaporation of the solvent from the droplets, the cyclical process of coulomb fission and solvent evaporation ultimately leads to the deposition of net charge onto the analyte molecule (e.g. blo-molecule) in the droplet. The bio-molecule, adducted by, for example, multiple protons, is desorbed from the droplet at atmospheric pressure. A small fraction of these ions pass through an orifice into the vacuum of the mass spectrometer for analysis.

A disadvantage of the ESI method is that only a small fraction (0.01% or less) of the sample material is utilized. The majority of the material emerging from the capillary ends up on the counter electrode or on the plate that has the sampling orifice. The reason for this is that the electric field that disperses the liquid solution into droplets is also responsible for causing detrimental space charge effects. Space charge effects arise because each droplet, and the resulting ions in the aerosol plume, all carry net charge of the same polarity, causing these droplets/ions to repel one another because of electrostatic repulsion. This causes the spray of droplets leaving the tip of the capillary to spread out into a cone having its apex at the tip of the capillary. Hence, the overall sample utilization efficiency is low in conventional ESI methods because the droplets/ions at atmospheric pressure are extremely difficult to focus through the sampling orifice. This limits the effectiveness of ESI if only a small amount of analyte is available for analysis, which is often the case in respect of bio-molecules.

MALDI involves the deposition of a sample, usually as a liquid, onto a flat plate or into recessed wells formed in a plate. A matrix of one or more compounds is also used. The matrix may be a solid or a liquid. The sample material can be deposited as a layer on top of or below the matrix or intimately mixed with the matrix. Typically, the matrix molecules are present in the starting solution in a concentration approximately 1000 times greater than the analyte molecules. After deposition, the plate is exposed to a pulsed laser beam. The matrix absorbs the energy from the laser, causing rapid vibrational excitation and desorption of the chromophore. The matrix molecules evaporate away and the desorbed analyte molecules can be cationized by a proton or an alkali metal ion. The ionized analyte molecules can be analyzed using a time-of-flight ("TOF") analyzer. In such a case, the overall technique is often referred to as matrix-assisted laser desorption and ionization time-of-flight mass spectrometry ("MALDI-TOF-MS").

Small sample spots produce higher sensitivity in MALDI. It has been suggested that the current fundamental limit for MALDI is 5 molecules per $\mu m^2$ and that providing a method of creating spots of a sample that are only 1-5 μm in diameter will lower the detection limit for MALDI: Keller, B. O. and Li, L. *J. Am. Soc. Mass Spectrum.* 2001, 12, 1055-1063. This could be accomplished using smaller capillary sizes to create smaller droplets. As has been pointed out, however, handling of volumes of picoliters becomes problematic in smaller inner diameter capillaries because of the higher surface to volume ratio that leads to stronger tension forces.

The need has therefore arisen for a method and apparatus for producing a source of ions, suitable for mass spectrometric analysis, from a discrete particle. The need has also arisen for improved techniques for depositing an analyte, such as a bio-molecule, onto a plate for MALDI mass spectrometry.

SUMMARY OF INVENTION

In accordance with one aspect of the invention, an apparatus for producing a discrete particle for subsequent analysis or manipulation is disclosed. The apparatus comprises a particle generator for generating a discrete particle; an induction electrode for inducing a net charge onto the discrete particle; and a levitation device for electrodynamically levitating the discrete particle following the induction of the net charge.

In one embodiment, the levitation device is an electrodynamic balance comprising a pair of separated levitation electrodes. The levitation electrodes may include a pair of first ring electrodes extending in parallel planes. Preferably a voltage difference is maintained across the first ring electrodes. For example, the voltage across the first ring electrodes may be approximately 20 V. The electrodynamic balance may be operable at variable frequencies. In order to minimize convection currents, the levitation device may be substantially enclosed within a chamber.

The apparatus may also include an electrode assembly for delivering the discrete particle from the levitation device to a target remote from the levitation device. The remote target may be, for example, an orifice in communication with the vacuum chamber of an atmospheric gas sampling mass spectrometer. Alternatively, the remote target may be a substrate for deposition of the particle thereon, such as a plate suitable for matrix assisted laser desorption and ionization mass spectrometric analysis.

The electrode assembly may form part of the levitation device or it may constitute a separate component of the apparatus. In one aspect of the invention the electrode assembly is operable at atmospheric pressure and comprises a first plate electrode positioned between the particle generator and the levitation device and a second plate electrode positioned between the levitation device and the orifice.

The first plate electrode and the second plate electrode each have apertures formed therein to permit the passage of the discrete particle therethrough.

In another aspect of the invention the levitation device is located proximal to the orifice and includes the electrode assembly.

In another aspect of the invention, the electrode assembly may comprise a quadrupole electrode assembly disposed between the levitation device and the orifice.

In yet another aspect of the invention the electrode assembly may include a stack of separated second ring electrodes disposed in parallel planes between the levitation device and the orifice. The second ring electrodes may be progressively smaller in diameter in the direction from the levitation device toward the orifice. For example, four separate second ring electrodes may be provided, each spaced approximately 3 mm apart from one another.

As will be appreciated by a person skilled in the art, the various electrode assemblies described herein may also be used if the remote target is something other than the an orifice in communication with a vacuum chamber of a mass spectrometer, such as a MALDI plate or some other substrate suitable for deposition of the discrete particle thereon.

Preferably the induction electrode is located proximal to the particle generator and a net charge is induced in the particle as it is generated by the particle generator. In one embodiment of the invention, the particle generator is a droplet generator for generating a discrete droplet comprising an analyte and solvent. The droplet generator may consist of a hollow, flat-tipped nozzle through which the discrete droplet is dispensed. The droplet is levitated in the levitation device for a sufficient period of time to allow at least partial desolvation of the droplet, thereby yielding a source of ions for mass spectrometric analysis.

As indicated above, the discrete particle may be deposited on a plate suitable for matrix assisted laser desorption and ionization mass spectrometric analysis. The plate preferably comprises a material for receiving the particle, such as a matrix coated on the plate. The particle generated by the particle generator may also comprise matrix material which is deposited on to the plate during the deposition step. In one embodiment of the invention the plate may comprise at least one recessed well. Each well may be pre-loaded with test samples, such as biological or chemical material potentially reactive with the discrete particle(s) deposited on to the plate.

The Applicant's apparatus may also include a translation stage for supporting a substrate, such as a MALDI plate. The translation stage is controllably movable relative to the levitation device.

In another embodiment of the invention Applicant's apparatus may comprise a particle generator for generating a discrete particle and a levitation device for levitating the discrete particle, wherein the discrete particle is delivered by the apparatus to a target remote from the levitation device. An electrode assembly may be employed for delivering the particle from the levitation device to the remote target as discussed above. In another embodiment, a laser having an adjustable focal point may be employed. In this embodiment the particle is delivered from the levitation device to the target by the laser.

In another embodiment of the invention an apparatus for delivering a source of ions to a vacuum chamber of a mass spectrometer is disclosed. The apparatus includes a droplet generator for generating a single isolated droplet, the droplet comprising solvent; an induction electrode for applying a net charge onto the droplet; a levitation device for levitating the droplet for a period of time sufficient to permit desolvation of the droplet to cause the droplet to become unstable, thereby releasing ions by droplet Coulomb fission; an orifice in communication with the vacuum chamber; and an electrode assembly for delivering the ions from the levitation device to the orifice.

The Applicant's invention also includes a mass spectrometer comprising a vacuum chamber; a detector for detecting the passage of ions through the vacuum chamber; a particle generator for generating a discrete particle; an induction electrode for ionizing the particle; a levitation device for electrodynamically levitating the discrete particle following the ionization; an orifice in communication with the vacuum chamber; and means to deliver the ionized particle from the levitation device to the orifice.

A method for producing a discrete particle for subsequent analysis or manipulation is also disclosed. The method comprises (a) generating a discrete particle; (b) inducing a net charge onto the discrete particle; (c) and electrodynamically levitating the discrete particle following the induction of the net charge. In one embodiment step (c) is carried out at atmospheric pressure. The method may also include the step of delivering the discrete particle from the levitation device to a target remote from the levitation device. For example, the discrete particle may be delivered to an atmospheric gas sampling mass spectrometer or a remote substrate, such as a MALDI plate. A material, such as a matrix, may be applied to the plate for receiving the particle. The particle itself may also comprise matrix material. The method may also include the step of moving the substrate relative to the levitation device, such as during a particle deposition session.

As indicated above, the discrete particle may be a discrete droplet comprising an analyte and solvent. In this case, Applicant's method may include the step of electrodynamically levitating the droplet for a period of time sufficient to permit at least partial desolvation of the discrete droplet.

The net charge is preferably induced when the particle is generated. The particle may be levitated by applying a constant voltage difference across an electrodynamic balance. In one variant the discrete particle may be subjected to a gas while it is levitated to control the evaporation rate of the solvent.

A method for separating a particle into sub-particles for subsequent analysis is also disclosed. The method comprises (a) generating a discrete particle comprising sub-particles; (b) inducing a net charge onto the particle; (c) electrodynamically levitating the particle (d) separating the sub-particles from the particle; and (e) sequentially delivering the sub-particles to a target for subsequent analysis.

In a further embodiment, Applicant's method includes the steps of (a) generating a discrete particle; (b) levitating the discrete particle; and (c) delivering the discrete particle to the target. In this method step (c) may be carried out by capturing the discrete particle in a laser beam and adjusting the focal point of the laser. As indicated above, the discrete particle may be levitated electrodynamically.

A method of mass spectrometry is also disclosed comprising: (a) generating a discrete particle; (b) ionizing the discrete particle; (c) electrodynamically levitating the ionized discrete particle; (d) delivering the ionized discrete particle to a vacuum chamber of an atmospheric pressure gas sampling mass spectrometer; and (e) detecting the passage of the ionized discrete particle through the vacuum chamber.

In another aspect of the invention, there is a method for carrying out a reaction comprising: (a) generating a plurality of discrete particles; (b) levitating the plurality of discrete particles; and (c) manipulating the plurality of discrete particles to react with one another while the plurality of discrete particles are levitating.

DESCRIPTION

Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

Figure 1:
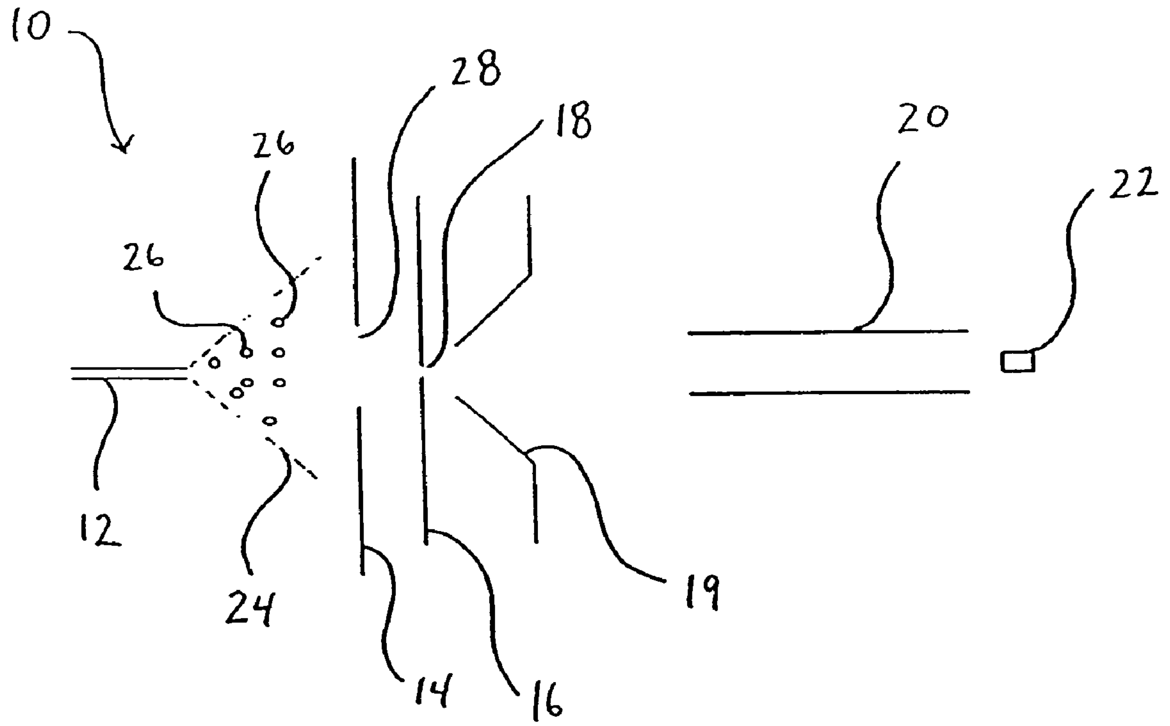
FIGURE 1 PRIOR ART
FIG. 1 is a schematic drawing of a prior art electrospray ionization arrangement.

FIG. 1 is a schematic drawing depicting a prior art ESI arrangement. In ESI arrangement 10, a metallic capillary 12 having an applied DC voltage is separated from a counter electrode 14 held at a lower DC potential. A plate 16 is positioned behind the counter electrode 14 and has an orifice 18 therein to allow the passage of ionized analyte molecules. To the right of sampling orifice 18 are the first and second stages of a differential vacuum. The region between plate 16 and a skimmer 19 is held at a first pressure and the pressure in the main vacuum chamber to the right of skimmer 19 is held at a lower pressure. The ionized molecules pass through a mass-to-charge analyzer 20 and are detected by a detector 22. In ESI arrangement 10, the liquid emerging from capillary 12 is dispersed into a fine spray 24 of droplets 26. The cyclical process of Coloumb fission and solvent evaporation ultimately leads to the deposition of a net charge onto the analyte molecules in the droplets. Unfortunately, much of the sample is wasted with ESI arrangement 10 because the droplets 26, all having net charge of the same polarity, repel, resulting in the spray 24 spreading out over an area that is many times greater than the aperture 28 in the counter electrode 14 and the orifice 18 leading into the vacuum. Thus, the overall sample utilization efficiency is low in conventional ESI arrangement 10.

Rather than producing millions of droplets per second that are susceptible to space charge effects as with ESI, this invention is based on the generation of a discrete particle. As used herein, the term "particle" includes a solid member, a droplet, a single molecule or a cluster of molecules (including one or more cells). A particle may therefore include one or more sub-particles. For illustration purposes only, the "particle" discussed herein is a single isolated droplet comprising an analyte (e.g. bio-molecule) and solvent. A net charge is placed onto the particle as it is generated. As used herein the term "ion" means a particle having a net charge.

The discrete particle is delivered to a levitation device. Delivery of the discrete particle could be accomplished, for example, by the particle generator used to generate the discrete particle. For example, where the particle generator is a droplet generator, the application of an electric pulse to a piezoelectric crystal in the droplet generator (with suitable backing pressure) will eject an isolated droplet with sufficient velocity to travel to the levitation device. Other suitable means to deliver the particle to the levitation device, such as gas stream, could alternatively be used.

The discrete particle is electrodynamically levitated by a levitation device. As used herein, the term "levitated" means that the particle is suspended. The period of time a particle is levitated may be varied depending upon the particular circumstances. The particle is then delivered from the levitation device to a remote target. As used herein the target is "remote" from the levitation device in the sense that it is spacially separated from the center or null position of the levitation device to some degree, although the quantum of separation may be small. In one aspect of the invention, the target is an orifice leading into (or otherwise in communication with) the vacuum of an atmospheric gas (and ion) sampling mass spectrometer. In another aspect of the invention, the target is a plate to be subjected to MALDI mass spectrometry following deposition of the particle on the plate. The discrete particle may be delivered to the target by an electrode assembly. Where the discrete particle is a droplet, the net charge lost from the droplet (referred to as a "parent" droplet) by Coloumb fission is delivered to the orifice of the mass spectrometer by manipulating the smaller droplets (referred to as "progeny" droplets). It is possible to levitate one or more particles in the levitation device simultaneously.

Figure 2:
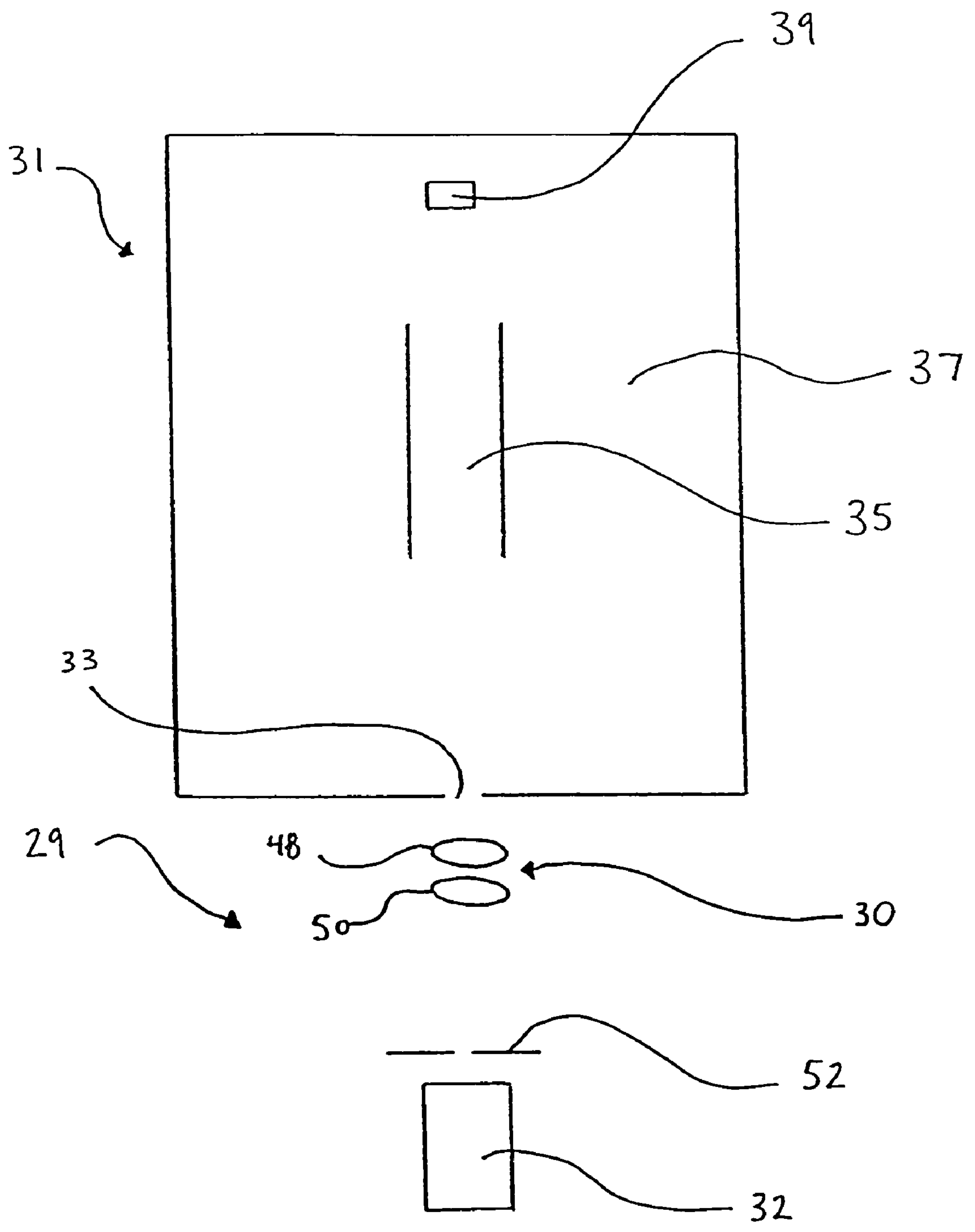
FIG. 2 is a schematic drawing of an exemplary apparatus of the invention.

FIG. 2 is a schematic illustration of an apparatus 29 of the invention. Apparatus 29 comprises a particle generator 32 and a levitation device 30. Particle generator 30 can be any means to generate a discrete particle, such as, for example, an aerosol generator or a droplet generator. Levitation device 30 can be any means to levitate a discrete particle. For illustration purposes, levitation device 30 has been described herein as comprising an electrodynamic balance comprised of two ring electrodes 48, 50. Those skilled in the art will appreciate that there are many configurations of electrodynamic balances and the like that fall within the scope of this invention. For example, ring electrodes 48, 50 may have different geometric configurations (e.g. annular and non-annular) without departing from the invention.

In operation, a discrete particle (not shown) is generated by particle generator 32, delivered to levitation device 30 and then levitated by levitation device 30 between ring electrodes 48, 50. Positioned between droplet generator 32 and levitation device 30 is an induction electrode 52. An electric potential is applied to induction electrode so as to induce a net charge of a desired polarity onto the discrete particle generated by particle generator 32. For example, a positive DC potential can be applied to induction electrode 52 to induce a negative net charge onto a discrete particle generated by particle generator 32. Conversely, a negative DC potential could be applied to induction electrode if it is desired to induce a net positive charge onto the discrete particle.

FIG. 2 also illustrates an atmospheric gas (and ion) sampling mass spectrometer 31 having an orifice 33, a mass filter 35 in a vacuum chamber 37 and a detector 39. Following levitation of the particle in electrodynamic balance 30, it is delivered to the orifice 33 for analysis by mass spectrometer 31. As will be explained further, in another aspect of the invention, the discrete particle may be delivered from the electrodynamic balance 30 and deposited onto a plate that is to be subjected to MALDI mass spectrometry analysis.

FIGS. 3-6 and 10 are schematic drawings of further exemplary apparatuses 68, 76, 78, 81, 88 of the invention in which the particle generator 32 is a droplet generator and the levitation device 30 is an electrodynamic balance comprised of ring electrodes 48, 50.

The apparatuses 68, 76, 78, 81, 88 each comprise a levitation device 30 and a droplet generator 32. Droplet generator 32 is operatively connected to a liquid sample containing the analyte in solution. As illustrated in FIGS. 3-6 and 10, the droplet generator 32 may be connected at a bottom portion **32*b* to a syringe 34 by tubing 36**. It will be appreciated that liquid sample delivery could also be made by any one of other known methods, for example, a separation method such as a chromatography column or a micro-fabricated column on a glass or silicon chip.

Figure 17:
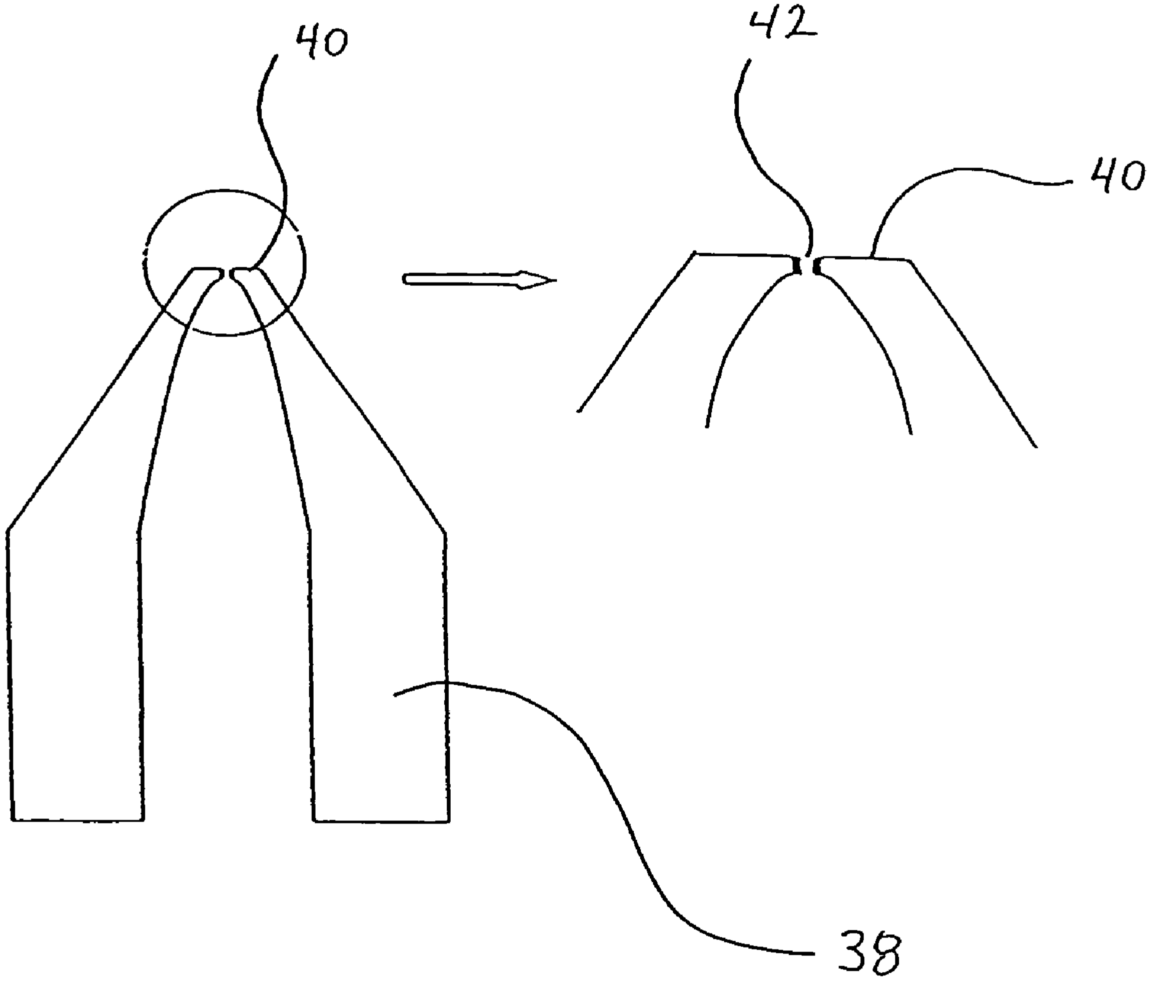
FIG. 17 is a cross-sectional view of the nozzle of the droplet generator of the apparatuses in FIGS. 3-6.

A nozzle 38 is fitted to an upper portion **32*a* of the droplet generator 32 in the embodiments illustrated in FIGS. 3-6. Nozzle 38 assists in maintaining stable droplet generation. Nozzle 38 is illustrated in more detail in FIG. 17. Nozzle 38 has a flat tip 40 surrounding an aperture 42. Aperture 42 is vertically coaxial with the center of the levitation device 30 and the orifice 44 leading to the vacuum chamber 46**.

Figure 8:
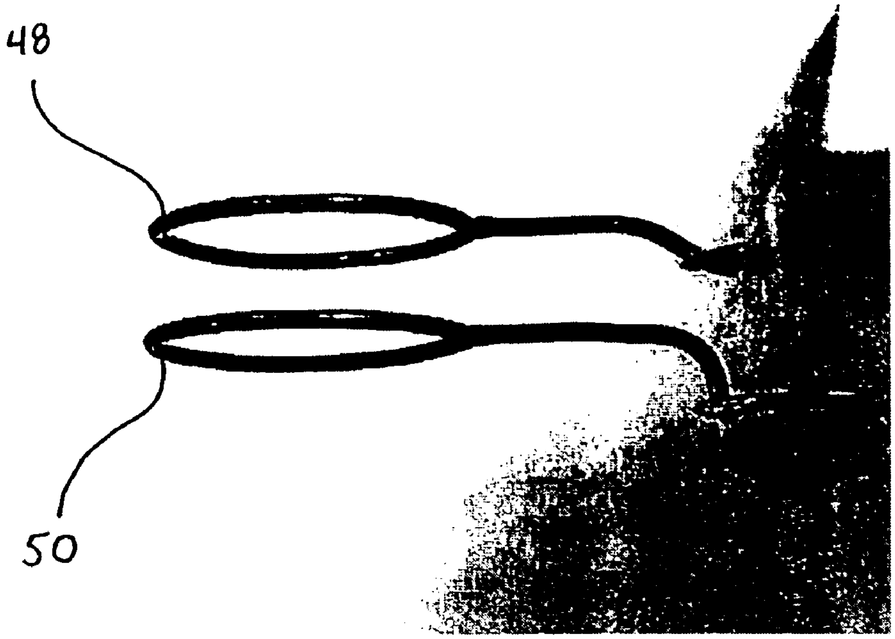
FIG. 8 is an illustration of the levitation device of the apparatuses illustrated in FIGS. 2-6.

Levitation device 30 is positioned above droplet generator 32. In the illustrated embodiments of the invention, levitation device 30 is an electrodynamic balance comprised of two parallel vertically spaced-apart ring electrodes 48, 50. Ring electrodes 48, 50 may be constructed of copper wire. Ring electrodes 48, 50 are also depicted in FIG. 8.

Positioned between droplet generator 32 and electrodynamic balance 30 is an induction electrode 52. A potential is applied to induction electrode 52 so that a net charge is induced onto each droplet generated from droplet generator 32 before it is delivered to the electrodynamic balance 30. The polarity of the potential will be determined by the net charge desired to be induced onto the droplet generated by droplet generator 32.

The apparatuses 68, 76, 78, 81 are illustrated in positions below an atmospheric gas (and ion) sampling mass spectrometer 65. In the FIGS. 3-6, mass spectrometer 65 comprises a vacuum chamber 46, a skimmer 58 having an orifice 57 in alignment with droplet generator 52, and a delrin spacer 62 electrically isolating the skimmer 58 from the vacuum chamber 46. The vacuum chamber 46 houses a channel electron multiplier 64, which passes the CEM ion current to an appropriate counting unit (not shown). The vacuum chamber 46 may be differentially pumped.

The apparatuses 68, 76, 78, 81 of FIGS. 3-6 also comprise a plexiglass chamber 66 enclosing the electrodynamic balance 30 in order to minimize convection currents that might otherwise preclude levitation of the droplet(s). An orifice 44 in a top plate 67 leads into the vacuum chamber 46 of mass spectrometer 65.

The apparatuses 68, 76, 78, 81 illustrated in FIGS. 3-6 are identical with respect to: (a) the structure of electrodynamic balance 30 and droplet generator 32; and (b) the separation between nozzle 38 of droplet generator 32 and electrodynamic balance 30. The structural differences between the apparatuses 68, 76, 78, 81 relate to the arrangement of various electrode assemblies for the manipulation and direction of progeny droplets and ions from the electrodynamic balance 30 toward the orifice 44 leading into vacuum chamber 46 of a mass spectrometer 65.

Figure 3:
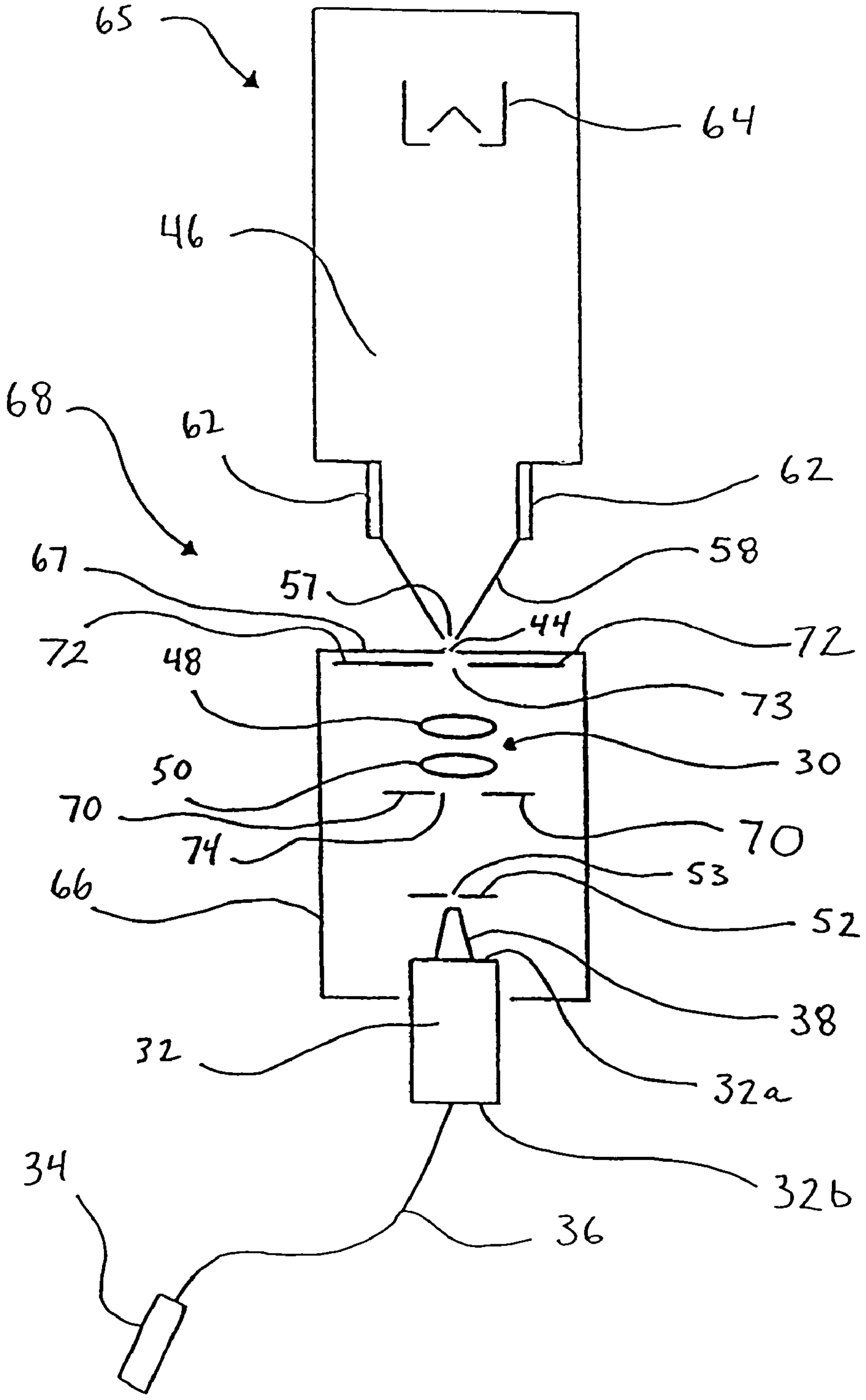
FIG. 3 is a schematic drawing of an alternative embodiment of the apparatus in FIG. 2.

Referring to FIG. 3, apparatus 68 comprises a two electrode assembly to guide progeny droplets and the ions desorbed from such droplets toward the sampling orifice 44. The two electrode assembly comprises a bottom electrode and a top electrode. Bottom electrode comprises a bottom plate electrode 70 that is positioned above droplet generator 32 and below electrodynamic balance 30, while top electrode comprises a top plate electrode 72 positioned above electrodynamic balance 30. Top plate electrode 72 could be a conventional counter electrode, such as that used in ESI arrangement 10. Bottom plate electrode 70 defines an aperture 74 therein to allow droplets generated from droplet generator 32 to be delivered to electrodynamic balance 30. Top plate electrode 72 defines an aperture 73 therein to allow passage of droplets to be delivered from electrodynamic balance 30 to orifice 44.

Figure 4:
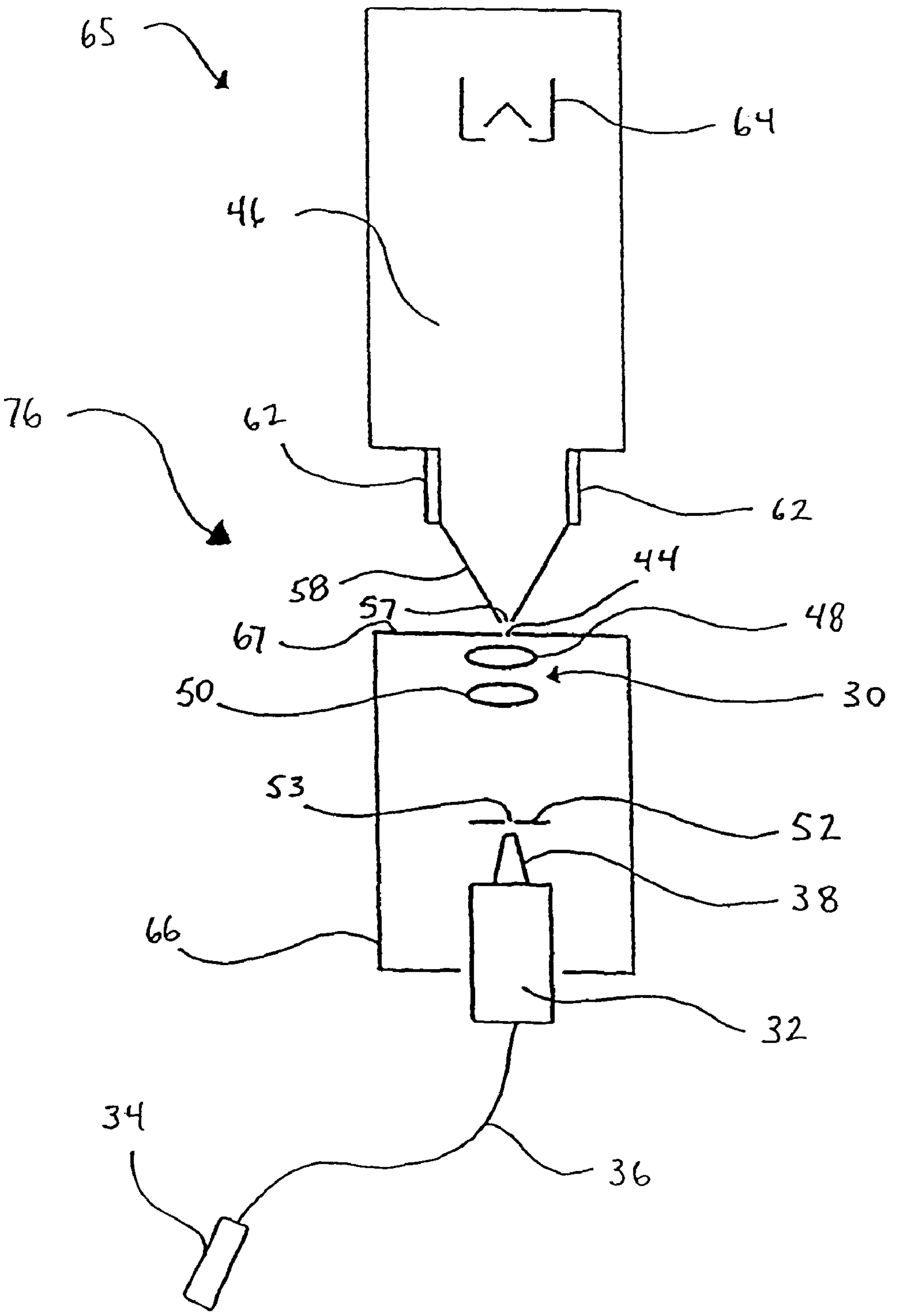
FIG. 4 is a schematic drawing of a further alternative embodiment of the apparatus in FIG. 2.

Referring to FIG. 4, the only electrodes in apparatus 76 are ring electrodes 48, 50. That is, relative to apparatus 68 of FIG. 3, bottom plate electrode 70 and top plate electrode 72 are omitted. Levitation ring electrodes 48, 50 are positioned proximal to sampling orifice 44 in apparatus 76.

Figure 5:
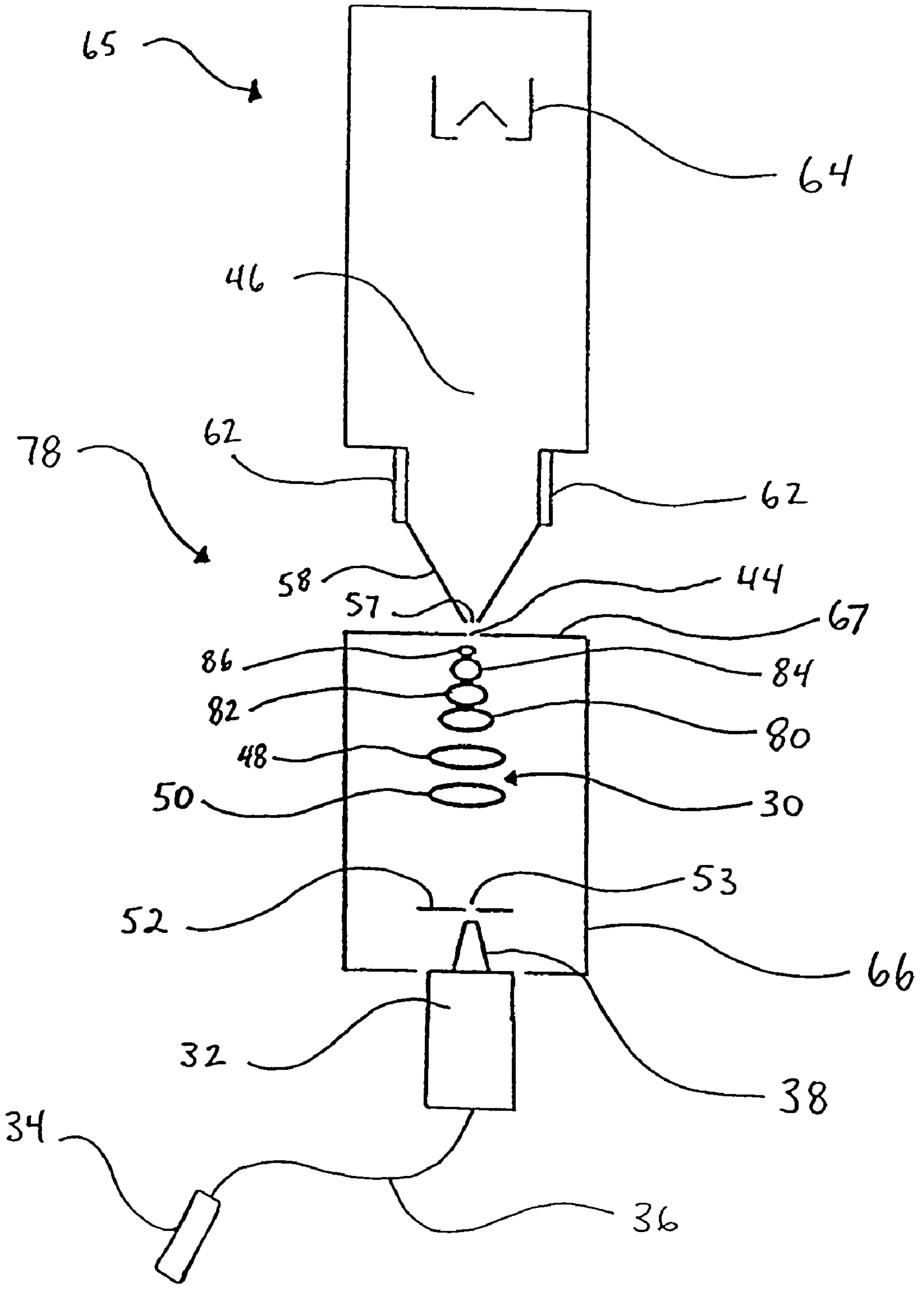
FIG. 5 is a schematic drawing of a further alternative embodiment of the apparatus in FIG. 2.
Figure 9:
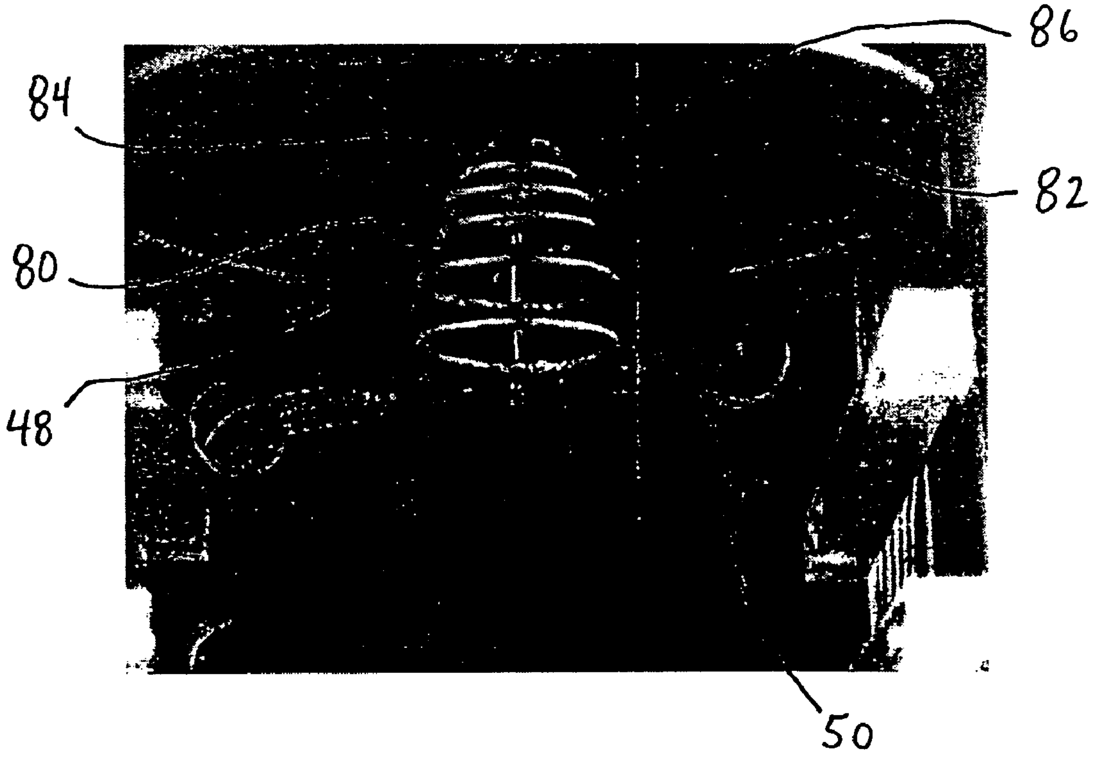
FIG. 9 is an illustration of the levitation ring electrodes and above-positioned guide ring electrodes of the apparatus in FIG. 5.

Referring to FIG. 5, apparatus 78 includes four guide ring electrodes 80, 82, 84, 86 positioned above levitation ring electrodes 48, 50. Each higher positioned guide electrode has a smaller diameter than the immediately lower guide electrode. That is, the diameter of electrode 80>the diameter of electrode 82>the diameter of electrode 84>the diameter of electrode 86. The spacing between guide electrodes 80, 82, 84, 86 may be fixed such that the spacing between guide electrodes 80 and 82 is the same as, for example, that between electrodes 84 and 86. The guide ring electrodes 80, 82, 84, 86 are also illustrated in FIG. 9. It will be appreciated that any number of guide electrodes (within design constraints) could be utilized instead of the four that are illustrated in the embodiment of the apparatus 78 in FIG. 5.

Figure 6:
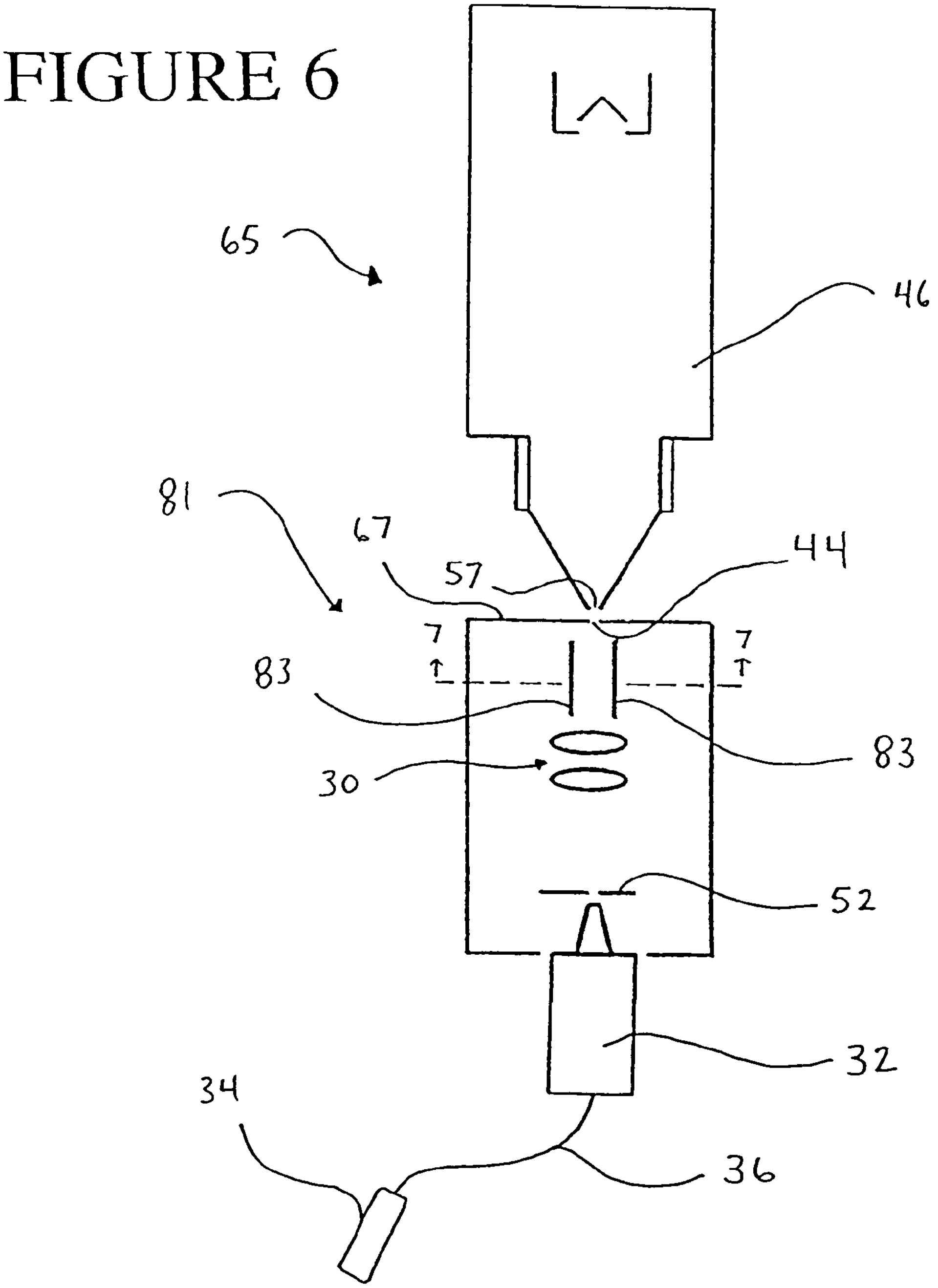
FIG. 6 is a schematic drawing of a further alternative embodiment of the apparatus in FIG. 2.
Figure 7:
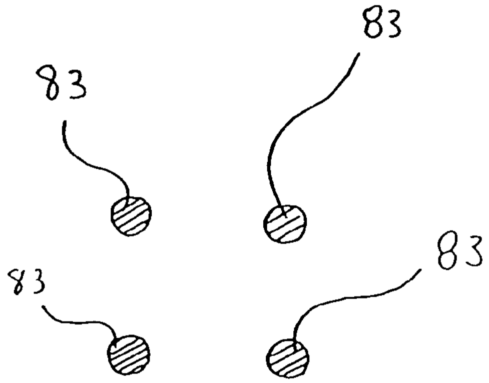
FIG. 7 is a cross sectional view taken along line 7-7 of FIG. 6.

Referring to FIG. 6, apparatus 81 is similar to apparatus 78 (FIG. 5) with the exception that a quadrupole of four cylindrical electrodes 83 is positioned where the stack of guide ring electrodes 80, 82, 84, 86 was positioned in apparatus 78. FIG. 7 is a cross-sectional view showing the quadrupole electrode arrangement of apparatus 81.

In operation, droplets (not shown) are generated by and ejected upwardly one at a time from droplet generator 32 at an initial velocity sufficient to rise to the center of the electrodynamic balance 30 (i.e. mid-point between rings 48, 50 and vertically coaxial with sampling orifice 44) without the assistance of an electric field. A net charge is induced onto droplet at the time it is generated by passing through an aperture 53 of induction electrode 52.

It is possible to levitate a charged droplet between levitation ring electrodes 48, 50 without the application of DC potential to the levitation ring electrodes 48, 50 to offset gravity, though as explained later, DC voltages are applied to manipulate and guide progeny droplets and particles out of electrodynamic balance 30. In one embodiment, charged droplets may be levitated between levitation ring electrodes 48, 50 through the application, to both ring electrodes 48, 50, of an AC potential (60 Hz) of 1300 V with 0° phase difference. It is contemplated that electrodynamic balance 30 could be a variable frequency electrodynamic balance. Differing waveforms (e.g. AC, DC or AC and DC) could be applied to electrodynamic balance 30 to levitate the particle.

Droplets levitated in the levitation device 30 (i.e. between levitation ring electrodes 48, 50) will shrink, via evaporation of solvent, to the Coulomb limit. At the Coulomb limit, the droplet will fragment or "explode" releasing ions and progeny droplets.

The ions and the progeny droplets may be guided to the sampling orifice 44 (and into vacuum chamber 46) for mass spectrometry. This could be accomplished, for example, using the electrode assemblies of apparatuses 68, 76, 78, 81 illustrated, respectively, in FIGS. 3-6. As compared to prior art ESI, this approach significantly reduces space charge repulsion, enabling higher transmission efficiency of net charge in the parent droplet inside the electrodynamic balance 30 to the mass spectrometer 65. Previously, there have been no attempts to collect the current ejected from a single droplet for study by a mass spectrometer. This invention thus allows the collection, with a mass spectrometer, of a higher fraction of current originating from a single parent droplet with net charge. This creates an ion source that permits very high sensitivity (low concentration detection limits) coupled with the high chemical specificity of a mass spectrometer.

As noted above, the electrode assemblies described above for the apparatuses 68, 76, 78 of FIGS. 3-6 may allow the control of the delivery of the progeny droplets and ions from the electrodynamic balance 30 towards the orifice 44 into the vacuum chamber 46.

Referring to the apparatus 68 of FIG. 3, the vertical position of the progeny droplets and ions desorbed therefrom can be manipulated by, for example, varying the DC potentials across bottom plate electrode 70 and top plate electrode 72. Droplets and ions are directed upwardly to orifice 44 through aperture 73 in top plate electrode 72.

Referring to the apparatus 76 of FIG. 4, a constant voltage difference applied across the two levitation ring electrodes 48, 50 causes progeny droplets and ions to be directed upwardly from the electrodynamic balance 30. In one embodiment of the apparatus, a constant DC voltage across the ring electrodes 48, 50 is defined as $(V_{r,top}-V_{r,bottom})=-20$ V, where Vr, top is the DC voltage applied to the top ring electrode 48 and Vr, bottom is the DC voltage of the bottom ring electrode 50, and where Vr, top was varied between 30 and 280 V.

Referring to the apparatus 78 of FIG. 5, the manipulation of the progeny droplets and ions is effected by guide ring electrodes 80, 82, 84, 86 positioned above electrodynamic balance 30. It has been found that the same DC and AC potentials applied to the top ring electrode 48 can be applied to guide ring electrodes 80, 82, 84, 86. Droplets and ions are directed upwardly to orifice 44 through guide ring electrodes 80, 82, 84, 86.

Referring to apparatus 81 of FIG. 6, the manipulation of the progeny droplets and ions is effected by the vertically-oriented quadrupole electrode assembly of cylindrical electrodes 83 that is positioned above electrodynamic balance 30. FIG. 6 shows only two cylindrical electrodes 83, though the cross sectional view of FIG. 7 shows all four cylindrical electrodes 83. Droplets and ions are directed upwardly from electrodynamic balance in between the four electrodes 83.

In an another aspect of the invention, droplets and particles may be ejected from the electrodynamic balance 30 for deposition onto a plate for mass spectrometric analysis by MALDI, rather than being ejected for direct mass spectrometry as described above. The analyte-containing droplet may be deposited onto a MALDI plate which has been pre-coated with a matrix or, alternatively, the matrix could be added to the starting solution so that each droplet generated includes both analyte and matrix molecules. In this latter instance, the MALDI plate is, not matrix pre-coated.

Figure 10:
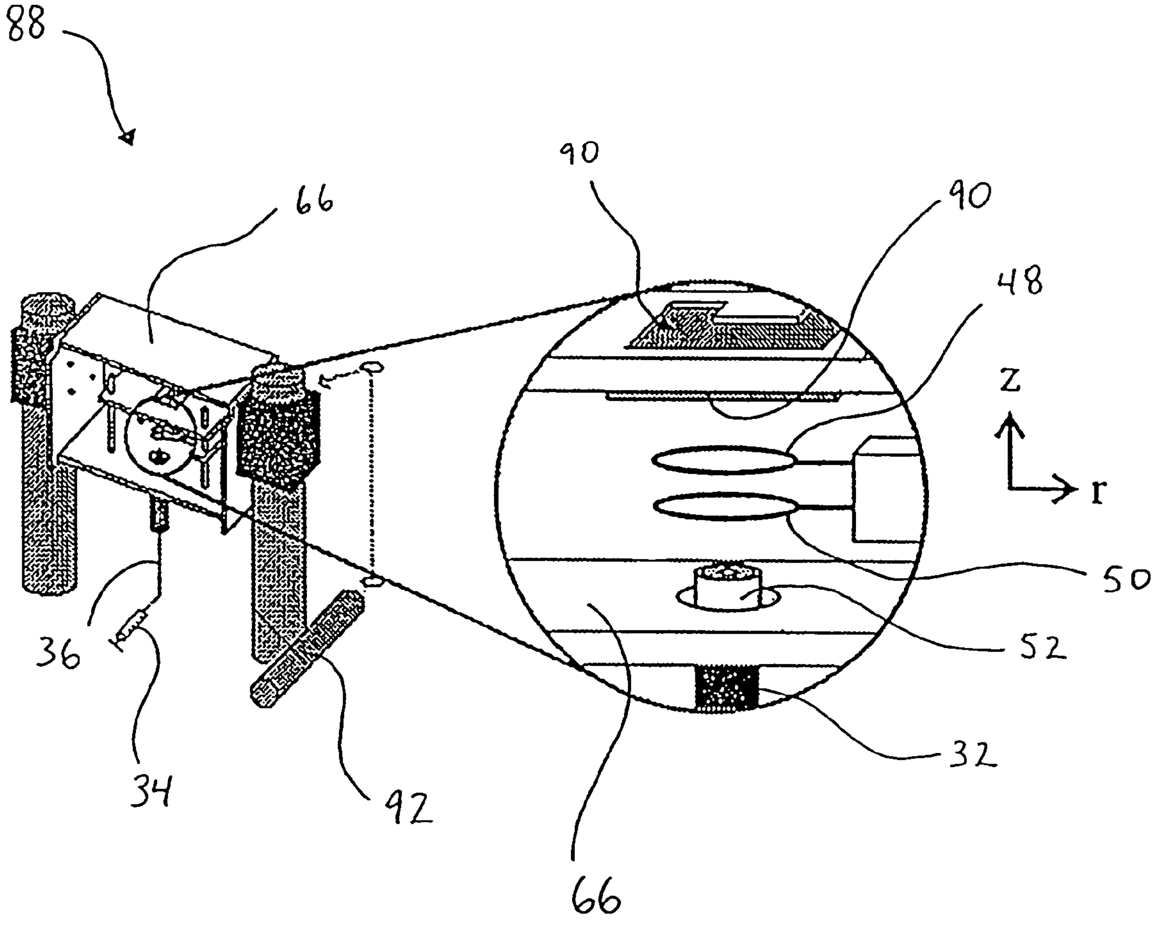
FIG. 10 is a perspective view of an exemplary apparatus of the invention with a MALDI plate positioned above the levitation device.

An apparatus 88 for depositing droplets onto a MALDI plate 90 is illustrated in FIG. 10. The apparatus 88 is similar in structure to apparatus 76 of FIG. 4 in that droplet generator 32, tube 36, syringe 34, induction electrode 52, an electrodynamic balance 30 comprising two levitation ring electrodes 48, 50 and plexiglass chamber 66 are all present as with apparatus 76 of FIG. 5. Apparatus 88, however, has a MALDI plate 90 positioned above levitation ring electrodes 48, 50 in place for deposition of droplets ejected from the electrodynamic balance 30. For viewing purposes, a laser 92 is positioned to provide illumination of the droplets within the electrodynamic balance 30 via forward scattering. Laser 92 could, for example, comprise a 4 mW green HeNe laser.

The operation of apparatus 88 is similar to that described above in that droplets are generated by droplet generator 32, have a net charge placed thereon by induction electrode 52 and are levitated in levitation device 30 (i.e. between levitation ring electrodes 48, 50) for Coloumb fission. In order to eject the droplets from the ring electrodes 48, 50, the potential of the induction electrode 52 can be maintained and an increasing potential can be applied to the MALDI plate 90. The droplets, due to their net charge, are increasingly attracted towards the MALDI plate 90 and, eventually, are deposited thereon. The MALDI plate 90 can be pre-coated with a matrix 100 or, alternatively, the starting solution from which droplets are generated can include the matrix 100. In the latter case, the MALDI plate 90 is not precoated with matrix.

The plate 90 onto which the droplets have been deposited is then inserted into a mass spectrometer for analysis using MALDI in a conventional manner. Depositing a sample onto a plate 90 for MALDI mass spectrometry is advantageous in that the sample compounds in the deposited droplet/particle are pre-concentrated, thus allowing for smaller sample spot sizes. In some circumstances, this may replace the need to create micromachined surface wells on plates (which have been used in the past to reduce the sample spot material on the surface following deposition). Further, a desired array of deposited particles can be created on the deposition plate with appropriate increases being made to the DC potential of the MALDI plate. These factors will contribute to more sensitive MALDI mass spectrometry.

In one embodiment of the invention, plate 90 may be supported on a displacable translation stage (not shown) which is movable relative to levitation device 30, such as during a particle deposition session. The translation stage may be programmed to move in a predetermined path to yield the desired pattern of deposited particles on plate 90. As will be appreciated by a person skilled in the art, the deposition of particles, movement of the translation stage, and delivering of MALDI plates to a mass spectrometer for analysis may be automated for improved analytical results generation. For example, computer controllers and robots could be employed to reduce the need for operator intervention.

The following examples will further illustrate the invention in greater detail although it will be appreciated that the invention is not limited to the specific examples.

EXAMPLE 1

The current utilization rates of several embodiments of the apparatus of this invention were tested and compared with that obtained from a prior art ESI arrangement. The apparatuses tested were substantially similar to the embodiments of the apparatuses 68, 76, 78 illustrated in FIGS. 3-5, with the following parameters. For ease of reference, the tested apparatuses will be referred to as tested apparatuses 68, 76 or 78, as the case may be. For comparison purposes, an ESI arrangement having the following parameters was also tested ACS grade sodium chloride and tetrabutylammonium chloride salts were used to prepare 10 mM stock solutions using distilled deionized water. These two stock solutions were then diluted to 5 μM using ACS grade methanol prior to use in either the ESI apparatus or the tested apparatuses 68, 76, 78.

The ESI apparatus consisted of a stainless steel capillary (0.1 mm inner diameter×0.2 mm outer diameter) that was biased to 3 kV. Sample solutions were pumped into this capillary at a rate of 5 μL $min^{-1}$ with a syringe pump (Cole-Parmer, model 74900). A nitrogen curtain gas flow rate of 1 L $min^{-1}$ was delivered to the region between the sampling orifice and the counter electrode (held at 300V). The ES capillary was positioned 2-3 mm off the ion axis of the vacuum chamber and the capillary tip to counter electrode separation was 10 mm.

For tested apparatuses 68, 76, 78, a droplet generator (obtained from Uni-photon Systems, model 201, Brooklyn, N.Y., U.S.A.) was employed and set to generate droplets at 1 Hz. The droplet generator was housed in an 8-cm-long×1-cm-diameter stainless steel tube. Another stainless steel tube, terminated at both ends with standard plumbing fittings, ran through this housing. A piezoelectic crystal surrounded the inner tube inside the housing.

A nozzle (similar to nozzle 38 of FIG. 17) for the droplet generator was constructed by sealing a short piece of uncoated fused silica (35 μm i.d.×150 μm o.d.) into a borosilicate glass tube (1.6 mm i.d.×3.2 mm o.d.) using a laboratory flame. This newly formed fire-polished tip was rounded, and this was polished flat on optical lapping paper using a high speed drill to form the nozzle.

The end of the droplet generator housing opposite the nozzle was connected by a short length of tubing to a syringe. With the application of a high voltage pulse to the piezoelectric crystal, the stainless steel sample tube inside the droplet generator assembly constricted. With a suitable backing pressure from a syringe pump, a droplet was squeezed out of the nozzle and delivered to electrodynamic balance 30.

Droplets were caused to have a net positive charge through the use of an induction electrode, set at −125 V DC, that imparted a charge onto each droplet as it was formed. The induction electrode was positioned proximal to the nozzle of droplet generator.

The nozzle of the droplet generator was positioned 20 mm below the bottom ring of the electrodynamic balance, and on-axis with respect to both the center of the electrodynamic balance and the orifice leading to the vacuum chamber. The electrodynamic balance was constructed of two levitation ring electrodes (6.5 mm radius), made with 1.7-mm-diameter copper wire and aligned parallel at a separation distance of 4.6 mm. Charged particles were stored in the center of the electrodynamic balance, by applying a 60 Hz line signal, amplified to 1300 $V_{op}$, with 0° phase difference to both levitation ring electrodes. The droplets could be levitated with no DC voltages applied to the levitation ring electrodes. DC voltages applied were solely for the purpose of manipulating the progeny droplets.

Droplets ejected from the nozzle of the droplet generator were measured to have initial velocities of approximately 0.8 $ms^{-1}$ and were able to rise the distance (approximately 22 mm) to the center of the electrodynamic balance without the assistance of an electric field. A plexiglass chamber was used to minimize convection currents that may have otherwise precluded levitation of the primary droplet.

The magnitude of the DC voltage on the top levitation ring electrode was varied between 30 and 280 V, and the DC voltage applied to the bottom levitation ring electrode tracked that of the top electrode with a fixed offset of ($V_{r,top}-V_{r,bottom}$=)−20 V. The magnitude of the DC potential of the top ring electrode affected the velocity of the progeny droplets expelled by coulomb fission after they left the levitation device toward the sampling orifice. The constant DC voltage difference between the two levitation ring electrodes ($V_{r,top}-V_{r,bottom}$) of −20 V was sufficient to cause all progeny droplets to be ejected from the fissioning parent droplet in the upward direction only. From initiation of the first coulomb fission event, the droplet was observed to eject progeny droplets for less than 100 ms, with brief discontinuities, until the remnant of the primary droplet itself was ejected upwards, out of the electrodynamic balance. Laser light scatter from the progeny droplets allowed this behaviour to be observed with the naked eye. The DC offset potential applied between the two levitation ring electrodes did not noticeably affect the vertical position of the evaporating primary droplet within the electrodynamic balance. In contrast, during the time period following the initiation of the first Coulomb fission event (<100 ms), the primary droplet could be seen oscillating in the vertical direction with an amplitude less than 1 mm, presumably due to electrostatic recoil from the ejected progeny droplets.

A vacuum chamber was fitted to the tested apparatuses 68, 76, 78, as illustrated in FIGS. 3-5, and to the tested ESI arrangement. Two stages of differential pumping were used. A 50-μm-thick stainless steel foil with a 100-μm-diameter orifice (Harvard Apparatus, Canada, St. Laurent, Quebec, Canada) was used to sample the gas at atmospheric pressure into the first stage of pressure reduction (1 Torr). This foil was biased to 70 V DC. The differentially pumped chamber was evacuated by a 5.5 L/s rotary pump (Leybold, model D16A, Mississauga, Ontario, Canada). The orifice of the skimmer was 0.50 mm diameter and the separation distance between the orifice and skimmer tip was 3.2 mm. The skimmer was biased to 5 V. A deirin spacer electrically isolated the skimmer from the grounded vacuum chamber. A 50 L/s turbomolecular pump (Leybold, model TMP050) was used to evacuate the chamber that housed the channel electron multiplier (CEM) (Detect, model 310G, Palmer, Mass.). The bias potential for the CEM was −2400 V. The CEM ion current was passed through a photon counting unit (Hamamatsu, model 3866) and the resulting TTL signal counted. The separation distance between the skimmer tip and the CEM was 82 mm, and there were no electrode guides used in this region.

In the tested apparatus 68, a two plate electrode assembly, with one plate electrode above and one below the electrodynamic balance, was used to guide the progeny droplets. The bottom plate had a 5-mm-diameter aperture to allow droplets ejected from the droplet generator nozzle to pass directly up into the electrodynamic balance. Though FIG. 3 illustrates apparatus 68 with the bottom plate electrode 70, tests were also conducted with this bottom plate electrode 70 removed. A flow of nitrogen gas was delivered to the region between the sampling orifice plate and the counter electrode in the range of 0 to 0.5 L $min^{-1}$.

In the tested apparatus 76, the only electrodes at atmospheric pressure were the two levitation ring electrodes of electrodynamic balance 30. The DC potential applied to the top levitation ring electrode was varied from 150 to 280 V, with the DC voltage difference between the top and bottom levitation ring maintained at −20 V.

The tested apparatus 78 employs a series of four guide ring electrodes, positioned above the electrodynamic balance, to guide progency droplets. Each higher positioned guide ring electrode has a smaller radius than the immediately lower one. The guide ring electrodes were fabricated by making a ring from a short strand of 0.8-mm diameter copper wire. The guide ring electrodes were positioned above the levitation ring electrodes of electrodynamic balance in equal separation gaps of 3 mm. The same DC and AC electrode biasing applied to the top levitation ring electrode was applied to each of the guide ring electrodes. The top and bottom levitation ring electrodes of electrodynamic balance were DC biased to 280 and 300 V, respectively.

In the tested apparatuses 68 (both with and without bottom plate electrode 70), 76 and 78, a droplet generated by the droplet generator flew to the center of the electrodynamic balance (approximately 22 mm) in about 75 ms and was then levitated there while it desolvated. The droplet desolvated to the first coulomb limit 550±75 ms after the droplet was formed. The droplet fissioned, discontinuously, for less than 100 ms, after which the remnant of the original droplet was itself ejected from the electrodynamic balance. These observations were made by viewing the droplet, unaided by lenses, inside the electrodynamic balance by illuminating the droplet with a diode laser and manually measuring with a stopwatch the time from droplet generation to the initiation of the first coulomb fission event. The value of 550 ms is the average of 103 such measurements.

The positive ion current from the CEM in the vacuum chamber with the tested ESI arrangement was $\leqq 3\times10^{3}$ counts/s. The ion current was not dependent on the nature of the cation in solution, as both test solutions yielded the same ion count rate. In a separate experiment, the current arriving at a solid counter electrode plate was measured to be 500 nA, for both sample solutions. This corresponds to a current utilization efficiency of $\leqq 1\times10^{-9}$.

As with the ESI arrangement 10, the ion currents measured from single droplets with a net charge were not dependent on the nature of the cation in solution as both test solutions yielded the same ion count rates.

With the bottom plate electrode 70 of the tested apparatus 68 (of FIG. 3) in position, or removed, the mean ion count per droplet ranged from 0.3 to 1.8 counts, respectively. The tested apparatus 68 (with or without bottom plate electrode 70) thus yielded ion utilization efficiency per 10 s integral of approximately $1\times10^{-7}$, an improvement by two orders of magnitude in ion utilization over that measured for the ESI arrangement, which was measured to be $\leqq 1\times10^{-9}$.

For tested apparatus 76, levitation ring electrode 48 was positioned 2 mm from the sampling orifice (the separation between the levitation ring electrodes remained constant). Tested apparatus 76 yielded improved ion currents ranging between 2.5 to 5 counts per droplet, depending on the magnitude of the DC voltage bias applied to the levitation ring electrodes. It is surmised that the reason for the increase in counts is likely that with larger DC bias potentials applied to the levitation ring electrodes the progeny droplets, and ions, were caused to drift toward the sampling orifice at higher velocities, reducing the extent of off-axis diffusion of the progeny droplets and ions.

The highest ions currents measured from isolated droplets were recorded with tested apparatus 78. The top guide ring electrode 86 was positioned 2 mm from the sampling orifice, and the bottom guide ring electrode 80 was 3 mm above the top levitation ring electrode 48. Ion count rates of approximately 40 per droplet were measured with tested apparatus 78, and the ion utilization efficiency demonstrated with this data set was approximately $4\times10^{-6}$, a marked increase over the tested ESI arrangement.

Figure 11:
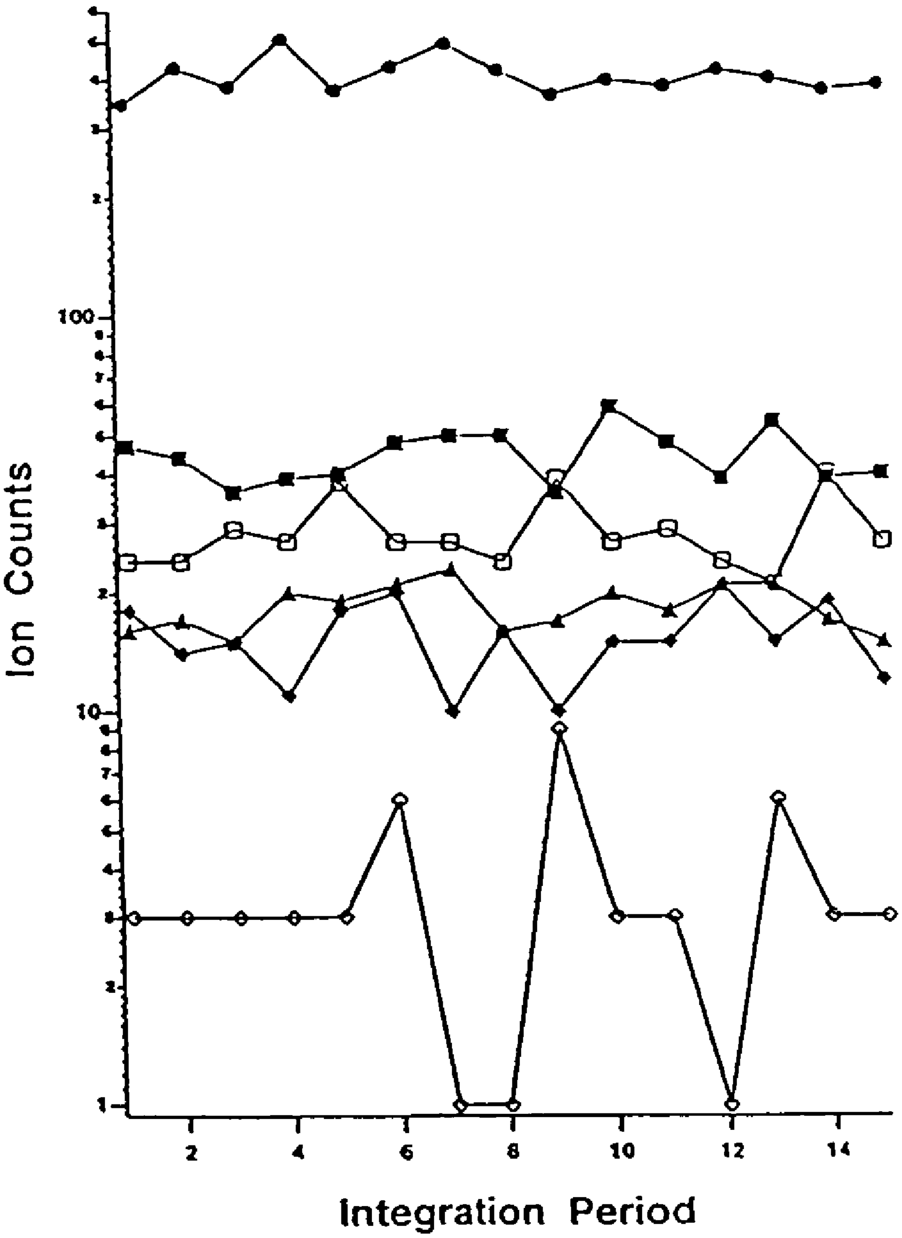
FIG. 11 is a graph plotting the ion counts over 10 s time integrals of the apparatuses tested in Example 1.

FIG. 11 is a graph plotting the ion counts over 10 s time integrals of the tested apparatuses 68 (with and without bottom plate electrode 70), 76 and 78. The symbols in FIG. 11 represent the results obtained from the following apparatuses:

(a) open diamond—tested apparatus 68 with the top (counter electrode) and bottom plate electrode biased to 30 and 500 V DC, respectively and the top and bottom electrodynamic balance electrode rings at 50 and 70 V DC, respectively;

(b) filled diamond—tested apparatus 68 with the top (counter electrode) and bottom plate electrode biased to 150 V and 500 V DC, respectively and the top and bottom electrodynamic balance electrode rings at 180 and 200 V DC, respectively;

(c) filled triangles—tested apparatus 68 with the bottom plate electrode 70 removed and the top (counter electrode) electrode biased to 150 V DC and the top and bottom electrodynamic balance electrode rings at 180 and 200 V DC, respectively;

(d) open squares—tested apparatus 76 with the electrodynamic balance rings at 180 and 200 V DC, respectively;

(e) filled squares—tested apparatus 76 with the electrodynamic balance rings at 280 and 300 V DC, respectively; and (f) filled circles—tested apparatus 78 with the electrodynamic balance rings at 280 and 300 V DC, respectively and the circular electrodes biased to 280 V DC.

EXAMPLE 2-6

Examples 2-6 relate to the use of droplet generator 32 and levitation device 30 to deposit sample onto a MALDI plate 90 for subsequent mass spectrometry.

The following apply for each of Examples 2-6:

(a) an apparatus substantially the same as the apparatus 88 of FIG. 10 was used to generate droplets, induce a net charge thereon, levitate the droplets in the electrodynamic balance and deposit the droplets onto MALDI plates. In one instance, the droplets were deposited onto a MALDI plate pre-coated with matrix, while in another instance, the matrix was added directly to the starting solution and the plates were not matrix pre-coated;

(b) following droplet deposition, the MALDI plates were removed from the electrodynamic balance chamber and analyzed using a Perseptive Biosystems Voyager-DE MALDI-TOF-MS;

(c) the analytes used were Chenodeoxycholic acid diacetate methyl ester and leucine enkephalin, while the matrix was α-cyano-4-hydroxycinnamic acid (HCCA). NaCl, NaOH, methanol and glycerol were also added to the starting solution;

(d) where matrix pre-coating of the MALDI plates occurred, it occurred as follows. A solution of 0.090 M α-cyano-4-hydroxycinnamic acid was prepared in methanol/acetone (60:40, v/v). A micropipette was used to deliver 10 ml of this solution onto a stainless steel MALDI plate that had no sample wells. Exposure of this wetted surface to the laboratory air was sufficient to form a coating of matrix (approximately 3.1 $cm^2$) on the surface of the MALDI plate;

(e) a droplet-on-demand generator (Uni-photon Systems, model 201, Brooklyn, N.Y., U.S.A.) was fitted with a nozzle having a 40 mm diameter that was constructed as noted above in Example 1. A positive DC potential on an induction electrode positioned 5 mm above the nozzle tip imparted a net negative charge onto each droplet. The droplet generator and the MALDI plate were positioned below and above the electrodynamic balance, respectively. This assembly was housed inside a plexiglass chamber (12"×8"×10") to minimize convective loss of droplets from the electrodynamic balance; and (f) the levitation device was constructed of copper wire (0.9 mm in diameter) that was shaped into 2 cm diameter rings mounted parallel at a separation distance of 6 mm. No DC potential was applied directly across the levitation ring electrodes of the levitation device. The vertical position of the droplets in the levitation device were manipulated by the DC potentials applied to the induction electrode and the MALDI plate. The amplitude of the AC potential (60 Hz) applied to the ring electrodes (in phase) ranged from 1,000 to 2,700 $V_{0-p}$. The droplets in the levitation device were illuminated via forward scattering by a 4 mW green HeNe laser.

EXAMPLE 2

Figure 12A:
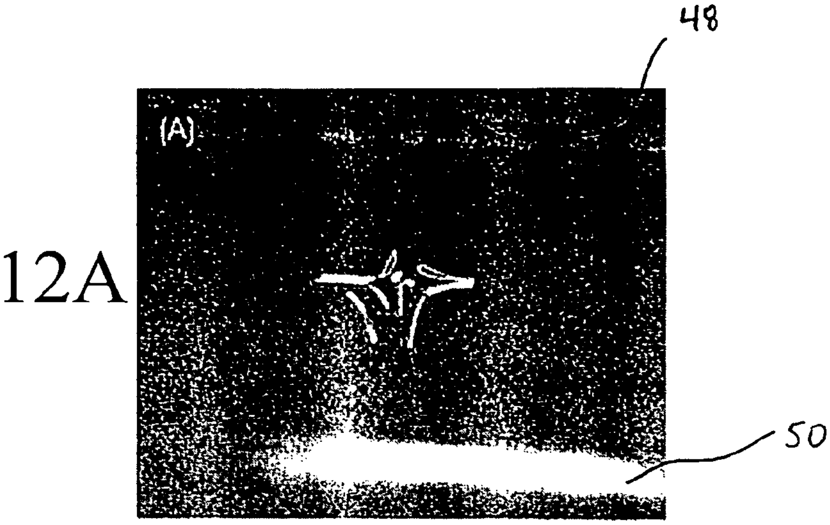
FIGS. 12A, 12B and 12C are magnified photographs illustrating, in sequence, the levitation of charged droplets in the levitation device and the ejection of a single droplet from the levitation device.
Figure 12B:
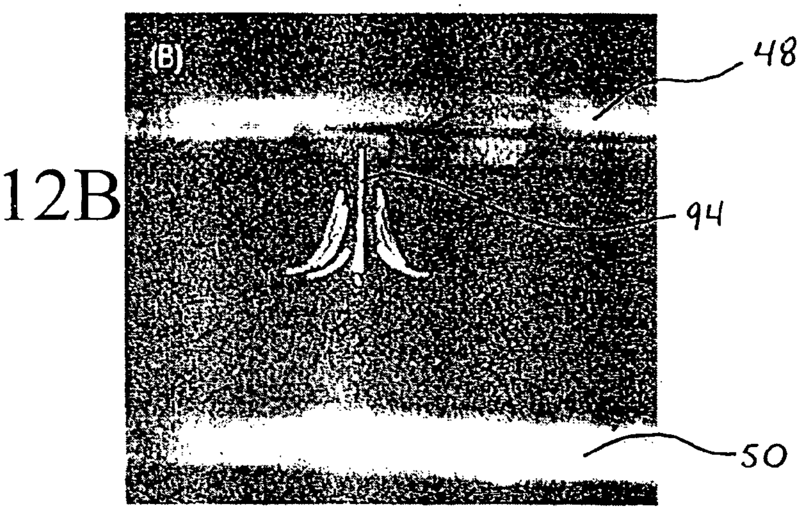
Figure 12C:
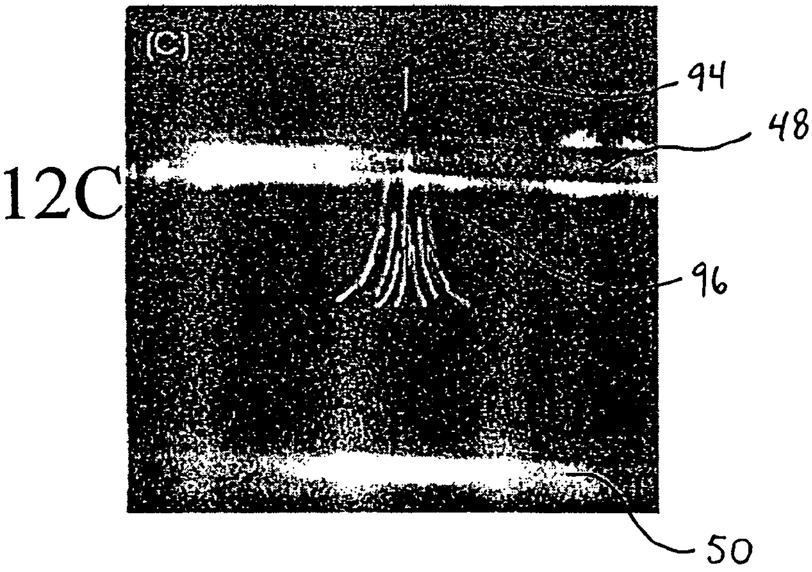

FIGS. 12A, 12B and 12C are photographs (magnification 5×) illustrating, in sequence, the levitation of charged droplets within the electrodynamic balance 30, and the ejection of a single droplet from within the electrodynamic balance 30. The photographs were acquired with a digital camera focused through a single microscope objective lens. The motion of a levitated droplet was at 60 Hz, the same frequency as the AC waveform applied to the ring electrodes of the electrodynamic balance. The frequency of oscillation of the droplet's trajectory was faster than the shutter speed of the camera, thus the droplets levitated in the electrodynamic balance appear in FIGS. 12A-12C as lines.

In the sequence from FIGS. 12A to 12C, the DC potential applied to the induction electrode (+125 V) and the AC trapping potential (1150 $V_{0-p}$) were held constant while the DC potential applied to the MALDI plate was increased from +150 V to +300 V. FIG. 12A represents a DC potential of +150 V applied to the MALDI plate, FIG. 12B represents a DC potential of +225 V applied to the MALDI plate and FIG. 12C represents a DC potential of +300 V applied to the MALDI plate. The droplets, net negatively charged, were increasingly attracted toward the MALDI plate as evidenced by movement of their median position of levitation from below the midpoint of the electrodynamic balance 30 (FIG. 12A) to increasingly higher positions above the midpoint of the electrodynamic balance (FIGS. 12B and 12C). Levitation ring electrodes 48, 50 of the electrodynamic balance 30 can be seen in FIGS. 12A-12C.

FIG. 12B illustrates a single droplet 94 that adopts a trajectory parallel to the z-axis at r=0. This droplet 94 attains the greatest maximum vertical displacement of all the droplets levitated. Further increasing the DC potential on the MALDI plate 90 caused this droplet 94 to reach a maximum vertical position that was well above the top levitation ring electrode 48 of the electrodynamic balance 30 (FIG. 12C). This droplet 94, with the largest amplitude of motion, had the highest mass-to-charge ratio of the droplets in the electrodynamic balance 30 (though the parameters for the droplet generator 32 were not varied during the generation of the droplets, there were small variances in the initial size and net charge on each droplet generated, resulting in a range of mass-to-charge ratios for the resulting droplets stored in the electrodynamic balance 30). A further increase in the DC potential applied to the MALDI plate caused this droplet 94 whose displacement was along the z-axis at r=0 to escape the trapping field of the electrodynamic balance 30 and impact onto the MALDI plate 90. With deposition of this droplet 94, the space charge induced by it onto the other droplets in the electrodynamic balance 30 was removed, and the position of the droplet 96 with the next highest mass-to-charge ratio in the electrodynamic balance 30 was able to relax to then occupy the central position in the electrodynamic balance 30. Further increases of the DC potential applied to the MALDI plate 90 could then be used to remove each droplet, one at a time from the electrodynamic balance 30, along the z-axis at r=0 for deposition.

EXAMPLE 3

Figure 13A:
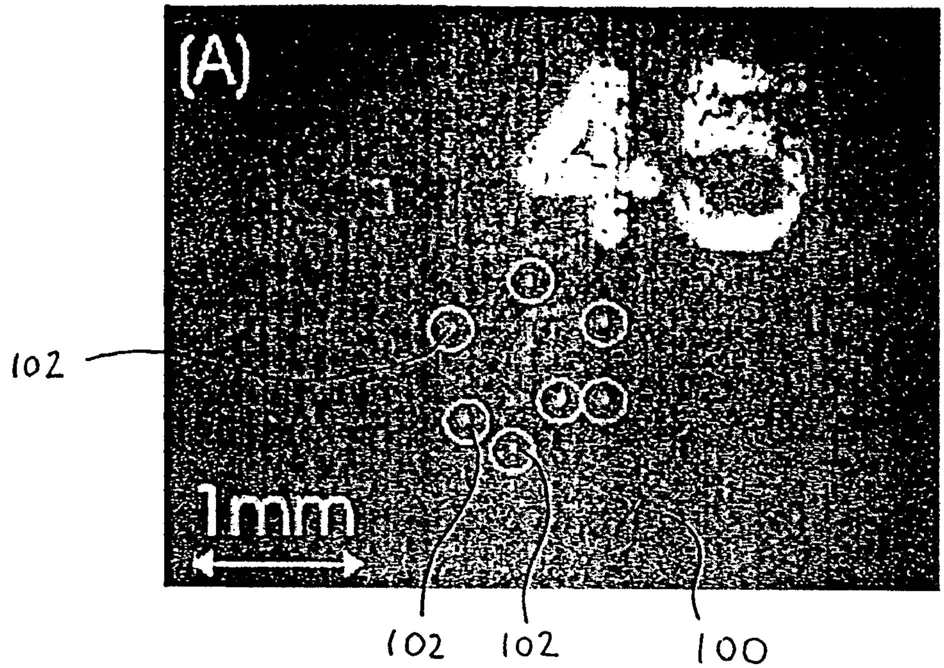
FIG. 13A is a magnified photograph of a MALDI plate, pre-coated in matrix, after the deposition of seven droplets simultaneously (or near simultaneously) ejected from the levitation device.
Figure 13B:
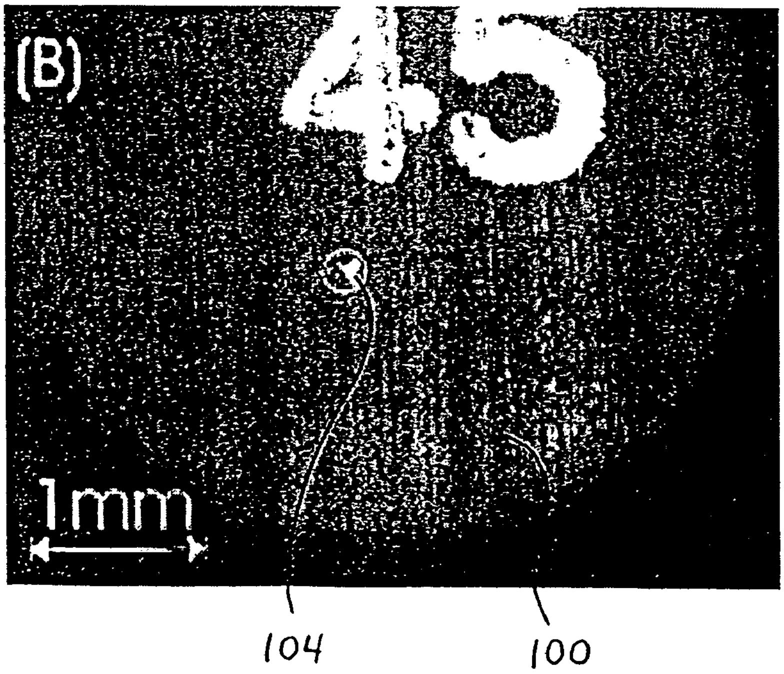
FIG. 13B is a magnified photograph of a MALDI plate, pre-coated in matrix, after deposition of twenty droplets ejected sequentially from the levitation device.

FIGS. 13A and 13B illustrate the results of different approaches for deposition of particles onto a MALDI plate 90. The photographs of FIGS. 13A and 13B were acquired by focusing a digital camera through a microscope. The magnification of FIG. 13A is 20× and the magnification of FIG. 13B is 25×. The number "45" appearing in FIGS. 13A and 13B was etched into the MALDI plate by the manufacturer.

FIG. 13A is a photograph of a MALDI plate 90, pre-coated in matrix 100, after the deposition of seven droplets 102 (circled for illustration purposes) simultaneously (or near simultaneously) ejected from the electrodynamic balance 30. Simultaneous ejection of the particles occured with the application of a single large potential pulse. In the case of FIG. 13A, the single pulse applied to the MALDI plate 90 was +850 V. This caused near instantaneous removal of the droplets 102 from the electrodynamic balance 30. In doing so, the relative positions of the levitated droplets at the instant of the application of the DC potential pulse became 'printed' onto the MALDI plate 90 as a result of the space charge on each of droplets 102. For example, deposition of the seven droplets 102 simultaneously resulted in droplet impaction over an area of approximately $1.8\times10^{-2}$ $cm^2$ with minimum droplet-to-droplet separation exceeding 100 mm.

In contrast, FIG. 13B illustrates the results of removing one droplet at a time from the electrodynamic balance 30 along the z-axis at r=0, in accordance with the method described in Example 2. In this example, the DC potential on the MALDI plate 90 was slowly ramped to a higher potential, enabling the deposition of twenty droplets from the electrodynamic balance 30 onto a spot 104 (circled for illustration purposes) on the MALDI plate sized to less than $3.1\times10^{-4}$ $cm^2$.

The data of FIG. 13B demonstrates that the inherent space charge induced trajectories of multiple droplets levitated in an electrodynamic balance did not interfere with sequential droplet deposition on to a single spot. Thus, the deposition technique of this invention provides small sample spot sizes required for high sensitivity MALDI applications. Being able to precisely deposit sample onto a small, pre-determined location on a MALDI plate is advantageous since it allows one to conduct more reliable and efficient MALDI mass spectrometry without worry that the sample spot will not be found by the laser.

Figure 13C:
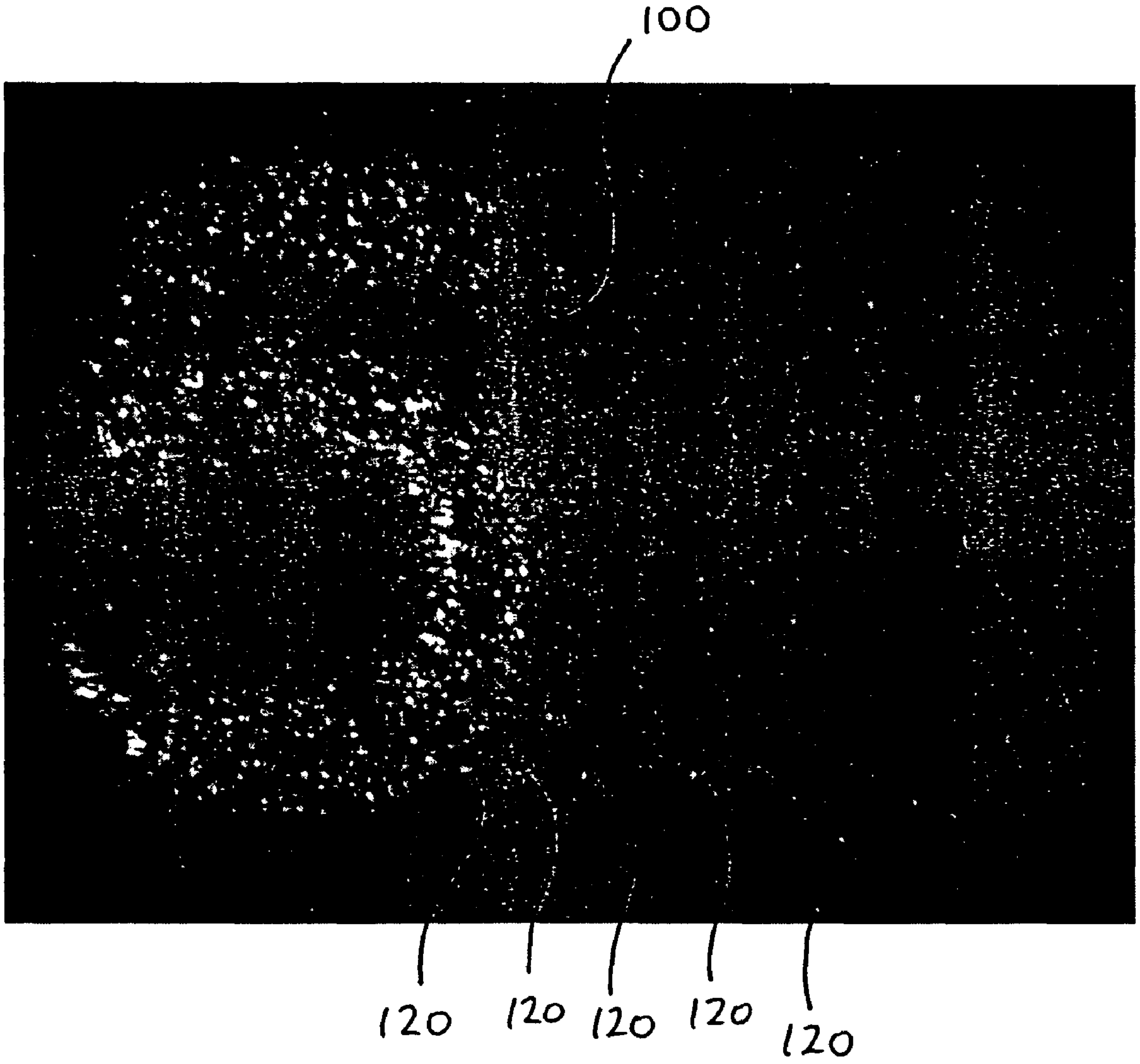
FIG. 13C is a photograph of droplets deposited onto a MALDI plate in a line array.

FIG. 13C is a magnified photograph of a series of droplets 120 that have been deposited from the electrodynamic balance 30 onto a MALDI plate 90 pre-coated with matrix 100 to form a horizontal line. This illustrates that the method of this invention may be used, for example, to prepare a desired array of deposited particles. In such a case, the sample preparation methodology could be interfaced with a separation technique. In FIG. 13C, the number "5" was etched into MALDI plate at the time of manufacture.

An array of particles on a substrate, such as the horizontal line array shown in FIG. 13C on a MALDI plate 90, could be achieved, for example, by mounting the MALDI plate 90 on a translation stage (not shown). Movement of the translation stage relative to the electrodynamic balance 30 between the ejection of levitated particles (or sub-particles in the case of application of the invention for separation technique purposes) from the electrodynamic balance 30 would result in levitated particle being deposited onto the MALDI plate 90 in an array.

EXAMPLE 4

Figure 14:
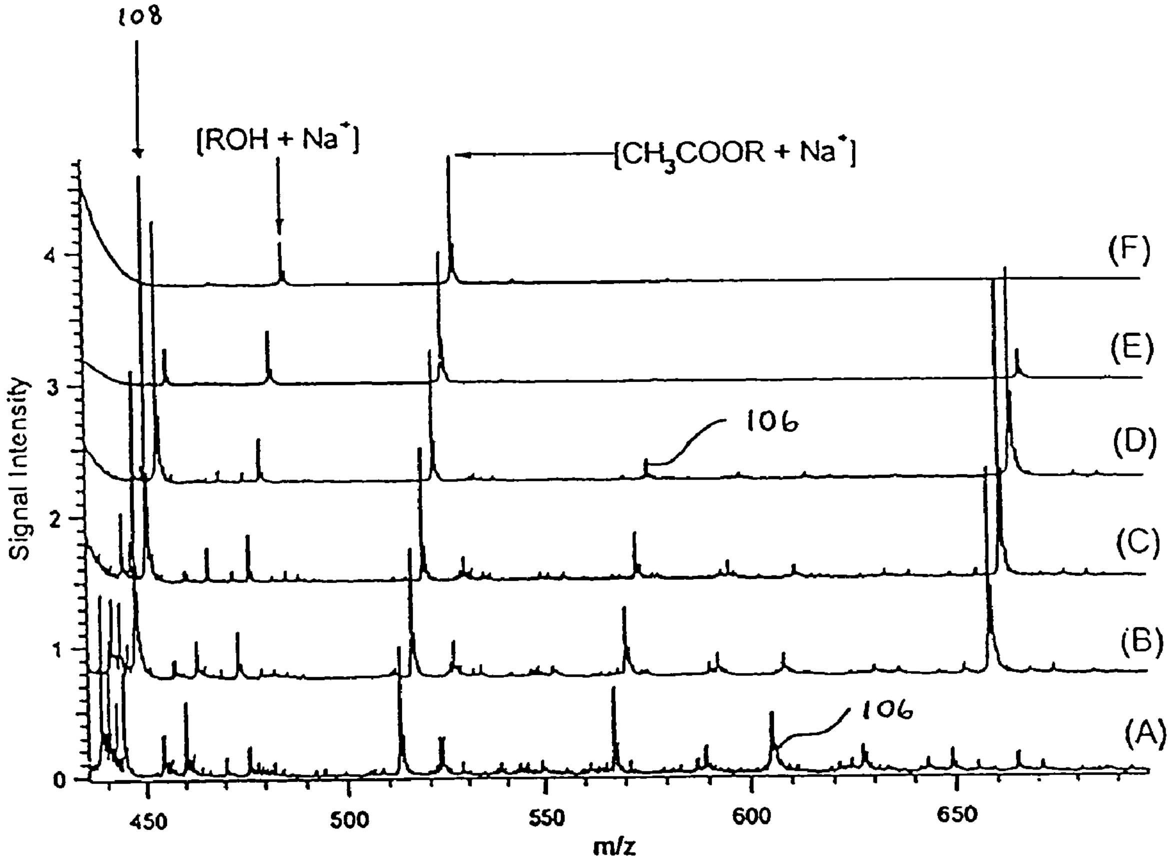
FIG. 14 is six consecutive mass spectra (labelled therein as A-F) collected from a single laser spot within which a single droplet had been deposited on a MALDI plate.

FIGS. 14 depicts six consecutive mass spectra (labelled A-F) collected from a single laser spot within which a single droplet had been deposited onto a MALDI plate 90 pre-coated with matrix 100. The droplet was generated from a starting solution containing the ester at $1.0\times10^{-3}$ M, or 460 fmol in a droplet having an initial radius of approximately 48 mm. The concentration of NaOH in the starting solution was $2\times10^{-3}$ M. The starting solution was used immediately after preparation, and there was no detectable hydrolysis product in it.

The droplet was levitated for 9 hours and 50 minutes in the electrodynamic balance. Based on the signal intensity ratio, the composition of the droplet that was deposited was approximately 300 fmol ester and approximately 160 fmol of its hydrolysis product, [$ROH+Na^+$], both of which were detected as sodium adducts in the spectra.

Spectra A-F illustrated in FIG. 14 are the average spectra of consecutive firings of the laser (with uniform settings) at the droplet deposition point, as follows:

| Spectra | Average Spectra of Laser Firing Nos. |
|---|---|
| A | 1-256 |
| B | 257-512 |
| C | 513-768 |
| D | 769-1024 |
| E | 1025-1280 |
| F | 1281-1536 |

Each droplet analysis was performed by centering, and holding an $N_2$ laser spot fixed on a single position over the site of droplet deposition. Mass spectra were collected with a delayed acquisition time of 25 microseconds.

In spectrum A, the signal-to-noise ration (S/N) and the signal-to-background ratio (S/B) for the sodium adduct of the ester were 100 and 70 respectively. In comparison, in spectrum F these values improved to 590 and 640 respectively. The peak for the sodium adduct of the ester is indicated as [$CH_3COOR+Na^+$] in spectrum F. Further increases in the S/N and S/B, to 1,800 and 2,700 respectively, were realized in the spectrum averaged from laser shot numbers 3580-3836 (data not shown).

Spectra A-F of FIG. 14 illustrate that the deposition method of this invention helps suppress matrix cluster ions, yielding "cleaner" spectra for analysis.

Figure 15:
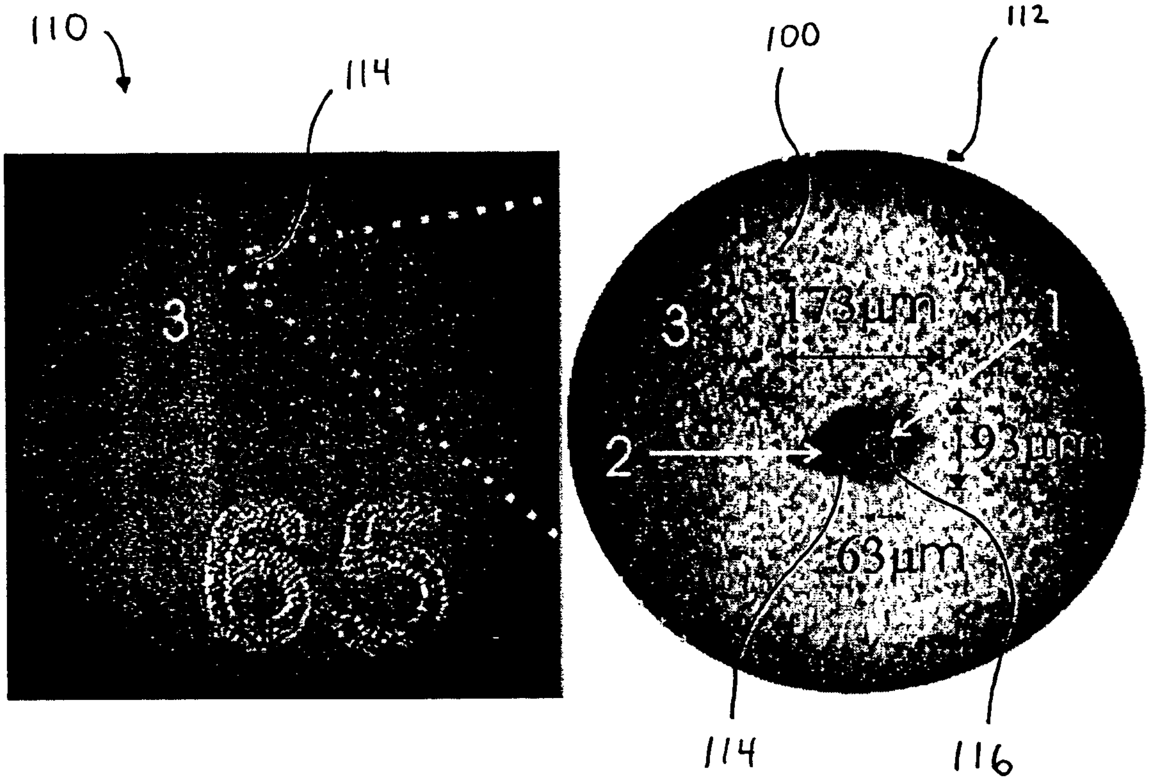
FIG. 15 is a magnified photograph of a MALDI plate, after 1,024 laser firings directed towards eight droplets deposited on top of one another on the MALDI plate.

Two types of background ions attributable to the matrix are present in the spectra of FIG. 15. One class ("Type I") was comprised of combinations of intact molecules and fragments of the matrix clustered with cation(s). The second class ("Type II") was comprised of intact matrix molecules (where the number of matrix molecules, n, =1, 2, 3, . . . ) clustered around cation(s).

Spectrum A of FIG. 14 is from the first 256 laser shots and, because the size of the deposited droplet was smaller than the laser spot size, there are many background ions of Type I and some of Type II at high relative signal intensity. Peaks 106 represent background ions of Type I.

Spectrum B shows, relative to spectrum A, a decrease in abundance of background ions of Type I and an increase in the abundance of Type II background ions. This results from the removal of free matrix (by ablation) surrounding the droplet within the laser spot. Peak 108 represents background ions of Type II.

After 1280 laser shots (i.e. Spectrum E of FIG. 14), the signal intensity of the background ions of Types I and II had decreased dramatically while the sodium-cationized ester and its hydrolysis product remained at high signal intensity. In spectrum F, the signal intensity of the background matrix ions had nearly disappeared, leaving a very clean spectrum with only analyte ion peaks at high signal intensity.

The presence of glycerol in the droplet assists in the increase in S/N and S/B with the increase of laser shot. The formation of matrix ions was eventually suppressed, in part because a matrix solution had formed within the glycerol droplet. This would increase the matrix intermolecular separation on the top most layer of the droplet and thus ions were being produced from fluid matrix as opposed to crystalline matrix surface. This decreased the propensity for matrix cluster ion formation. A further advantage of the presence of glycerol is that after each laser firing, analyte can diffuse up to the surface forming a more uniform layer of material for each subsequent firing of the laser.

EXAMPLE 5

FIG. 15 illustrates a photograph of a MALDI plate 90, after 1,024 laser firings directed towards eight droplets deposited on top of one another on the pre-coated MALDI plate 90. The photograph was obtained by focusing a digital camera through a microscope. The main photograph 110 is magnified 20× and the insert 112 on the right-hand side of the figure has been magnified 125×. The number "65" appearing in the photograph 110 is, again, a number etched into the MALDI plate 90 by the manufacturer.

A small dark region 114 where the laser was directed is illustrated in FIG. 15. The surrounding lighter area is the remaining thin coating of matrix 100. The right-hand insert 112 in FIG. 15 shows the laser spot 114 at a higher magnification. The remnants of the deposited droplets appear to have formed a single droplet 116 positioned within the dark region 114. The laser spot size is defined by the dark region 114 because it is the clean stainless steel MALDI plate 90 left behind once the matrix 100 had been ablated away. The glycerol droplet deposited on top of the matrix 100 was masking the ablation of the matrix below it while the free matrix 100 around it was removed. The presence of matrix 100 remaining below the droplet 116 in FIG. 14 was confirmed by the inability to create intact ions from a droplet without an underlying layer of matrix pre-coated onto the MALDI plate.

Before analysis, the deposited droplets were comprised of glycerol plus any non-volatile solutes that were in the starting solution. At atmospheric pressure and room temperature, the glycerol droplet existed for many hours, but once in the vacuum chamber of the mass spectrometer the glycerol was pumped away over a comparatively short time. The laser was fired immediately upon insertion of the plate into the vacuum chamber so the glycerol remaining on the plate assisted in fluidizing the solutes within the droplet between firings of the laser, improving signal reproducibility between laser shots. Alternatively, the firing of the laser may be delayed until after the glycerol had been pumped away. In such a case, there would remain a thin and concentrated layer of non-volatile solutes that were present in the starting solution.

It was found that laser shot numbers in excess of 1,024 at the droplet "island" 116 illustrated in FIG. 15 yielded mass spectra (not shown) that were remarkably devoid of matrix cluster peaks in the low mass-to-charge range.

EXAMPLE 6

Two sets of samples were prepared for deposition onto MALDI plates 90. In the first instance, the samples were deposited onto a MALDI plate 90 pre-coated with matrix 100 and in the second instance, the matrix was added directly to the starting solution and the plates 90 were not pre-coated with matrix 100.

Figure 16A:
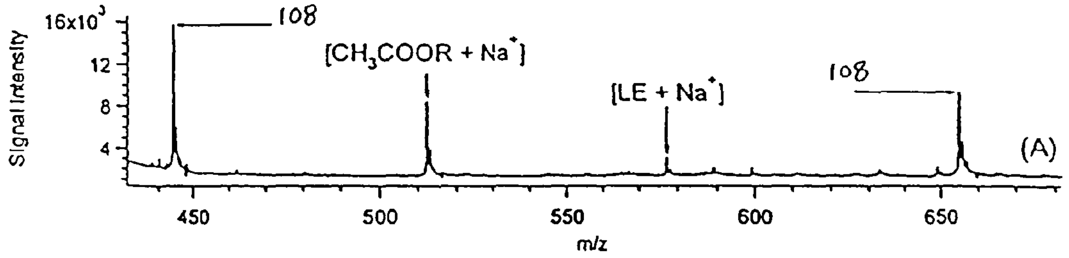
FIG. 16A is a mass spectrum of six droplets deposited onto a matrix pre-coated MALDI plate in accordance with the parameters of Example 6.

In the first instance, a starting solution comprised of $2\times10^{-4}$ M ester, $2\times10^{-6}$ M leucine enkephalin, and $2\times10^{-5}$ M NaCl in methanol:glycerol at 92:8% by volume was made. The ester acted as an internal check during MALDI-TOF-MS to ensure the laser was directed at the deposited droplets. Six droplets were deposited atop one another to form a single droplet on top of a layer of pre-dried crystalline matrix. Each droplet contained approximately 93 fmol ester and approximately 0.930 fmol of leucine enkephalin. FIG. 16A illustrates the mass spectrum collected from these six droplets. Both the ester and the leucine enkaphalin were cationized by sodium ion, and their S/N were 230 and 83 respectively. The peaks labelled 108 are from background matrix cluster ions.

Figure 16B:
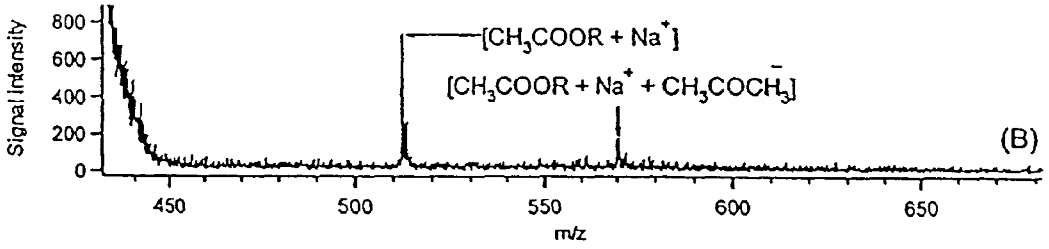
FIG. 16B is a mass spectrum of six droplets containing matrix deposited onto a fresh MALDI plate in accordance with the parameters of Example 6.
Figure 16C:
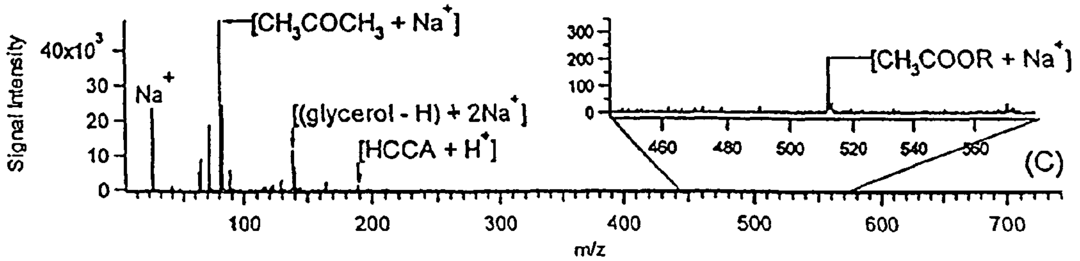
FIG. 16C is the full mass spectrum of FIG. 16B with no mass gate.

In the second instance, six droplets, each containing approximately 5 fmol ester, were created from a starting solution that contained $9.0\times10^{-5}$ M matrix and 97:3 methanol:glycerol % by volume. The droplets were levitated for several minutes before being depositing, on top of each other, onto a freshly cleaned stainless steel MALDI plate 90. FIG. 16B is the MALDI-TOF-MS spectrum collected from the residue created by these six deposited droplets. No matrix ions of Type I or II were observed in the spectrum from the first 256 laser shots. The large signal intensity below 450 m/z was the result of employing the low mass gate to increase sensitivity. The acetone cluster ion arises because the MALDI plate 90 was washed with acetone before the droplets were deposited onto the plate 90. FIG. 16C is the full mass spectrum of FIG. 16B with no mass gate. FIG. 16C shows low intensities of single intact matrix molecules (Type II, where n=1), but no background matrix ions of Type I or of Type II where n>1. The most intense signal in FIG. 16C is due to the sodiated adduct of acetone. This peak' arose because, again, the plate was washed with acetone. By simply washing with de-ionized water and air drying, this peak as well as the $[CH_3COOR+Na^++CH_3COCH_3]$ peak, could readily be eliminated.

Each droplet analysis was performed by centering, and holding an $N_2$ laser spot fixed on a single position over the site of droplet deposition. Mass spectra were collected with a delayed acquisition time of 25 microseconds.

The spectra of FIGS. 16A-16C suggest that the formation of background matrix cluster ions with two or more matrix molecules arises primarily from regions of crystallized matrix molecules. The signal intensity of such ions were dramatically reduced by adding glycerol and matrix to the starting solution, so that in the deposited droplet, there was less chance for matrix crystallization. This is advantageous for detection of small molecules by MALDI-TOF-MS, because its removes many of the matrix cluster ions that otherwise dominate the background of a spectrum, or cause chemical interference.

The above-described deposition method will greatly increase the reproducibility of MALDI since it has been shown that relative to a solid crystalline matrix layer, a matrix solution provides a more reproducible signal with time: Ring, S.; Rudich, Y. *Rapid Commun. Mass Spectrum*. 2000, 14, 515-519.

In the case of the droplets containing matrix in this example, the glycerol/HCCA matrix solution formed provides a much more uniform matrix from which to desorb. For example, 1087 laser shots were fired at the residue of the six droplets in FIG. 16B before the S/N decayed below ten. The large number of mscans collected from the small amount of material in the collection of six droplets was a consequence of the fluid matrix present in the microspots By analyzing liquid microspots prepared according to this invention, a sensitive and stable source of ions for MALDI is achieved. Further, the method of this invention will result in achieving lower absolute detection limits and improved quantitation.

Further, the use of an electrodynamic balance for sample deposition in MALDI mass spectrometry provides a solution to the surface tension problem encountered by handling sample in picoliter volume capillaries. The solution is offering a “wall-less” sample preparation procedure that is not limited by capillary tension forces.

As will be apparent to those skilled in the art in the light of the foregoing disclosure, many alterations and modifications are possible in the practice of this invention without departing from the scope thereof.

For example, the levitation of the particles in electrodynamic balance 30 was carried out in tested apparatuses 68, 76, 78, 88 in the Examples herein at atmospheric pressure. It will be appreciated, however, that the invention could be utilized at pressures other than atmospheric pressure (e.g. lowered or elevated pressures).

Similarly, the apparatuses, 68, 76, 78, 81 have been illustrated herein as being vertically-oriented and positioned below a mass spectrometer 65. It will be appreciated by those skilled in the art that the vertical orientation is not necessary to the invention, but that any number of different orientations (e.g. horizontal, etc.) could be utilized.

Similarly, it is within the scope of this invention to utilize electrode assemblies other than those specifically illustrated in FIGS. 3-7 to deliver the progeny droplets/ions to the target. For example, the quadrupole arrangement of electrodes 83 illustrated in FIGS. 6 and 7 could be replaced by an octapole arrangement of eight electrodes.

Similarly, it is within the inventive scope of this invention to levitate the particle(s) using non-electrodynamic levitation means. As an example, it would be possible to position a laser to direct a stream at generated particle, thereby inducing a dipole across the neutral particle. The laser-induced dipole would capture the particle within the laser stream, allowing levitation of the particle and eventual delivery of the particle to the targe by gradually adjusting the position of the focus of the laser stream until the particle, captured in the laser stream, is delivered to the target (e.g. the orifice of a mass spectrometer, a MALDI plate, etc.). An induction electrode would not be included, meaning that the particles generated in this embodiment of the invention would not have a net charge induced thereon.

It will be appreciated by those skilled in the art that the invention disclosed herein could be readily modified for any other quantitative chemical analytical technique such as, for example, fluorescence or Raman spectroscopy.

The invention will also have application in separating constituent sub-particles from a larger particle. The reason for this is that levitating a particle for a period of time in levitation device 30 will allow the particle to reach an equilibrium in which its constituent sub-particles can settle into various layers (which may, for example, comprise aqueous surface layers, layers of adsorbed organic molecules and a solid or liquid core), which can then be sequentially separated out of the levitated particle and analyzed independently of the other constituent sub-particles. In such an embodiment of the invention, the levitated particle could be subjected to a pulsed laser beam to cause the separation of the layers. Alternatively, the layers could be separated by Coloumbic fissioning following the induction of a net charge onto the discrete particle (as described above) or by desorption. The various layers and core could be sequentially deposited onto a MALDI plate, as described herein, and then subjected to MALDI mass spectrometry.

It may be advantageous to subject a levitated droplet to a flow of gas to control (e.g. promote or retard) the evaporation rate of the solvent in the droplet. For example, it may be advantageous to prolong evaporation of a droplet when it is desired to bring a droplet to equilibrium over a long period of time prior to separating the constituent sub-particles of the droplet, as aforesaid.

Another possible application of this invention is as a “wall-less” chemical reaction vessel. In such an application, reactants (e.g. droplets or particles) could be generated and levitated in the electrodynamic balance as aforesaid. Instead of being ejected for mass spectrometry, however, the levitated droplets/particles could then be spatially manipulated in the electrodynamic balance (by varying the potential of the electrodes) to coalesce. The advantage to this technique is that the surface-to-volume ratio is enhanced (relative to performing the same reaction in a traditional reaction vessel). This adaption of the invention could have many application, such as medical diagnostic purposes. A variation of this strategy would be to coat a cell, or a small population of cells that are levitated with matrix. The method of coating the surface of a cell can enable detection of the molecules that reside on the surface of the cell. With a cell levitated, it would be possible to subject the cell to various stresses, such as gas phase chemical reagents, or though a coalescence of two droplets, the introduction of a solution phase reagent. The latter application can be used to bring a digestive enzyme to the surface of the cell and generate peptide fragments from the membrane-proteins that protrude out of the cell.

Further still, this approach could be employed to add matrix to droplets prior to deposition onto a MALDI plate. In such an application, an analyte containing droplet and a matrix containing droplet, both independently generated by droplet generator 32 could be spatially manipulated and made to coalesce into a single droplet within levitation device 30 while levitating prior to deposition onto the MALDI plate.

Further still, a particle could be coated with matrix following the deposition of the particle onto the MALDI plate 90. In such an application, the particle is deposited onto the MALDI plate as aforesaid. A separate particle, containing the matrix, would then be independently generated by droplet generator 32 (or another particle generator) and levitated as aforesaid. The levitated matrix-containing particle would then be deposited onto the deposited particle (containing analyte), thereby coating the first droplet on the MALDI plate.

The invention could have application for subjecting a deposited particle to a test material applied to a substrate. For example, it would be possible to apply materials having biological, chemical or physical origin to a plate and then causing a particle to be delivered to that test material for subsequent analysis of the reaction. Such a reaction could take place in recessed wells of a MALDI plate by applying the test material to the wells before depositing the particles into those wells using the apparatus and method of this invention. This application of the invention could be advantageous for testing the effectiveness of drugs and other similar purposes.

Further still, the invention could have application for polymerizing progeny droplets, which at the moment of their formation, are approximately 100-1000 nm in diameter. With care, it would be possible to allow these progeny droplets to desolvate to smaller diameters before polymerizing their surface to encapsulate the contents of these droplets. This procedure could be used to prepare round nanometer sized materials that could be designed to be either hollow or solid.

It is within the inventive scope herein to utilize more than one droplet generator in the same apparatus. Such an arrangement could have application where it was desired to generate two reactant particles for a "wall-less" chemical reaction while in the electrodynamic balance 30, or, as noted above, where it was desired to coalesce of a matrix droplet with an analyte-containing droplet. Similarly, it would also be possible to use more than one electrodynamic balance 30 in a side-by-side arrangement whereby the multiple balances would be sequentially movable into an aligned position relative to droplet generator 32.

Accordingly, the scope of the invention is to be construed in accordance with the substance defined by the following claims.

What is claimed is:

1. An apparatus for producing a discrete droplet for subsequent analysis or manipulation, said apparatus comprising:

(a) a droplet generator for generating a discrete droplet;

(b) an induction electrode for inducing a net charge onto said discrete droplet located proximate to said droplet generator, wherein said induction electrode has an aperture formed therein for passage therethrough of said discrete droplet;

(c) a levitation device for electrodynamically levitating said discrete droplet following the induction of said net charge and optionally desolvating the droplet to obtain progeny droplets and ions via Coulomb fission; and (d) an electrode assembly for controllably delivering a discrete, optionally desolvated droplet or resulting progeny droplets and ions from said levitation device to a target remote from said levitation device for subsequent analysis or manipulation.

2. The apparatus of claim 1, further comprising said target, wherein said target is a substrate.

3. The apparatus of claim 2, wherein said substrate is a MALDI plate.

4. The apparatus of claim 3, wherein said material is MALDI plate is pre-coated with a MALDI matrix.

5. The apparatus of claim 3 wherein said plate comprises at least one recessed well.

6. The apparatus of claim 2, wherein said electrode assembly comprises a stack of separated ring electrodes disposed in parallel planes between said levitation device and said substrate.

7. The apparatus of claim 6, wherein said ring electrodes are progressively smaller in diameter in the direction from the levitation device toward the said substrate.

8. The apparatus of claim 7, comprising four separate ring electrodes, each spaced approximately 3 mm apart from one another.

9. The apparatus of claim 2, wherein said electrode assembly comprises a quadrupole electrode assembly between said levitation device and said substrate.

10. The apparatus of claim 2, comprising a translation stage, wherein said substrate is positioned on said translation stage and wherein said translation stage is controllably movable relative to said levitation device.

11. The apparatus of claim 1, wherein said apparatus comprises an atmospheric gas sampling mass spectrometer and wherein said target is an orifice in communication with a vacuum chamber of said mass spectrometer.

12. The apparatus of claim 11, wherein said electrode assembly comprises a first plate electrode positioned between said particle generator and said levitation device and a second plate electrode positioned between said levitation device and said orifice.

13. The apparatus of claim 12, wherein said first plate electrode and said second plate electrode each have apertures formed therein to permit the passage of said discrete droplet therethrough.

14. The apparatus of claim 11, wherein said electrode assembly comprises a stack of separated ring electrodes disposed in parallel planes between said levitation device and said orifice.

15. The apparatus of claim 14, wherein said ring electrodes are progressively smaller in diameter in the direction from the levitation device toward the said orifice.

16. The apparatus of claim 15, comprising four separate ring electrodes, each spaced approximately 3 mm apart from one another.

17. The apparatus of claim 11, wherein said electrode assembly comprises a quadrupole electrode assembly between said levitation device and said orifice.

18. The apparatus of claim 1, wherein said a droplet generator generates a discrete droplet comprising an analyte and solvent.

19. The apparatus of claim 1, wherein said levitation device is an electrodynamic balance.

20. The apparatus of claim 19, wherein said electrodynamic balance is a pair of separated levitation electrodes.

21. The apparatus of claim 20, wherein said pair of levitation electrodes are a pair of first ring electrodes extending in parallel planes.

22. The apparatus of claim 1, wherein said apparatus comprises a chamber substantially enclosing said levitation device.

23. The apparatus of claim 1, wherein said electrode assembly comprises a first plate electrode positioned between said particle generator and said levitation device and a second plate electrode positioned between said levitation device and said substrate.

24. The apparatus of claim 23, wherein said first plate electrode and said second plate electrode each have apertures formed therein to permit the passage of said discrete droplet therethrough.

25. The apparatus of claim 1, wherein said droplet generator comprises a hollow, flat-tipped nozzle through which said discrete droplet is dispensed.

26. A method for producing a discrete droplet for subsequent analysis or manipulation, said method comprising:

(a) generating a discrete droplet using a droplet generator;

(b) inducing a net charge onto said discrete droplet using an induction electrode located proximate to said droplet generator, wherein said induction electrode has an aperture formed therein for passage therethrough of said discrete droplet;

(c) delivering the charged discrete droplet to a levitation device;

(d) electrodynamically levitating said discrete droplet following the induction of said net charge using a levitation device, while optionally desolvating the droplet and obtaining progeny droplets and ions via Coulomb fission; and (e) controllably delivering an optionally desolvated discrete droplet or progeny droplets and ions from said levitation device to a target remote from said levitation device for subsequent analysis or manipulation using an electrode assembly.

27. The method of claim 26, wherein the step of controllably delivering comprises delivering said discrete droplet or progeny droplets and ions to an atmospheric gas sampling mass spectrometer for mass spectrometric analysis, and wherein said target is an orifice in communication with said atmospheric gas sampling mass spectrometer.

28. The method of claim 27, wherein said discrete droplet comprises analyte and solvent, and wherein said levitation device levitates said droplet for a period of time sufficient to allow desolvation of said droplet so that Coloumb fission occurs, which results in forming progeny droplets and ions, including charged analyte.

29. The method of claim 28 wherein said progeny droplets and ions are delivered to said orifice for mass spectrometric analysis in said atmospheric gas sampling mass spectrometer.

30. The method of claim 26, wherein said target is a substrate.

31. The method of claim 30, wherein said substrate is a MALDI plate.

32. The method of claim 31, wherein said MALDI plate is not precoated with a MALDI matrix.

33. The method of claim 31, wherein said MALDI plate is precoated with a MALDI matrix.

34. The method of claim 33, wherein said droplet comprises an analyte and a solvent, and the method further comprises performing the step of MALDI analysis after delivering the droplet or progeny droplets and ions to the precoated MALDI plate.

35. The method of claim 30, comprising the step of moving said substrate relative to said levitation device.

36. The method as defined in claim 35, comprising repeating the steps defined in claim 43 while moving said substrate relative to said levitation device to deposit an array of said droplet or progeny droplets and ions on said substrate.

37. The method of claim 26, wherein said discrete droplet comprises an analyte and solvent, and wherein said discrete droplet is electrodynamically levitated for a period of time sufficient to permit at least partial desolvation of said discrete droplet.

38. The method of claim 37, comprising the step of subjecting said discrete droplet to a gas while said discrete particle is levitated to control the evaporation rate of said solvent.

39. The method of claim 37, wherein said desolvation is continued for a period sufficient to cause Coulomb fission of said droplet into a plurality of progeny droplets and ions.

40. The method of claim 39, comprising the step of delivering said progeny droplets and ions from said levitation device to said target for subsequent analysis or manipulation.

41. The method of claim 40, comprising the step of subjecting said droplets and ions to mass spectrometric analysis.

42. The method of claim 41, wherein the droplets and ions are deposited onto a MALDI plate and wherein said mass spectrometric analysis comprises MALDI analysis.

43. The method of claim 42, wherein said MALDI plate is pre-coated with a MALDI matrix.

44. The method of claim 42, wherein said droplets comprise a MALDI matrix plate with said ions.

45. The method of claim 42, wherein said droplets and ions are sequentially deposited onto said plate.

46. The method of claim 26, wherein step (c) is carried out at atmospheric pressure.

47. The method of claim 26, wherein said levitation device comprises an electrodynamic balance.

48. The method of claim 47, wherein said electrodynamic balance is a pair of first ring electrodes extending in parallel planes.

49. The method of claim 48, wherein said discrete droplet is levitated by applying a constant voltage difference across said pair of first ring electrodes.

50. The method of claim 49, wherein said voltage is about 20 V.

51. The method of claim 26, wherein said net charge is induced when said droplet is generated.

52. A system for performing mass spectrometry analysis comprising:

(a) a mass spectrometer;

(b) a droplet generator for generating a discrete droplet;

(c) an induction electrode for inducing a net charge onto said discrete droplet located proximate to said droplet generator, wherein said induction electrode has an aperture formed therein for passage therethrough of said discrete droplet;

(d) a levitation device for electrodynamically levitating said discrete droplet following the induction of said net charge; and optionally desolvating the droplet to obtain progeny droplets and ions via Coulomb fission;

(e) an electrode assembly for controllably delivering a discrete, optionally desolvated droplet or resulting progeny droplets and ions from said levitation device to a target remote from said levitation device for subsequent mass spectrometric analysis; and (f) the target.

53. The system as defined in claim 52, wherein said target is a substrate for deposition of said droplet or progeny droplets and ions thereon for said subsequent mass spectrometric analysis.

54. The system as defined in claim 53, wherein said substrate is a MALDI plate.

55. The system as defined in claim 54, wherein said MALDI plate is pre-coated with a MALDI matrix.

56. The system as defined in claim 52, wherein said mass spectrometer is an atmospheric gas sampling mass spectrometer and wherein said target is an orifice in communication with a vacuum chamber of said mass spectrometer.

* * * * *